United States Patent
Skillman et al.

(10) Patent No.: US 10,218,802 B2
(45) Date of Patent: Feb. 26, 2019

(54) TIERED NOTIFICATION FRAMEWORK

(71) Applicant: Microsoft Technology Licensing, LLC, Redmond, WA (US)

(72) Inventors: Peter Nils Skillman, Mercer Island, WA (US); Gregory Thomas Mattox, Jr., Bellevue, WA (US); Omobayonle AyoYinka Olatunji, Seattle, WA (US); Lola Marie Ball, Redmond, WA (US); Allison Anne O'Mahony, Bellevue, WA (US); Carmen Quan, Bellevue, WA (US); Brian Daniel Beck, Woodinville, WA (US); Christopher Wallace Heuser, Bellevue, WA (US); Eduardo Quijano Rivadeneyra, Bothell, WA (US); Song Zou, Clyde Hill, WA (US); Michael John Bray, Bellevue, WA (US); Patrick Seth Donoghue, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 232 days.

(21) Appl. No.: 15/365,865

(22) Filed: Nov. 30, 2016

(65) Prior Publication Data
US 2018/0109639 A1 Apr. 19, 2018

Related U.S. Application Data

(60) Provisional application No. 62/409,871, filed on Oct. 18, 2016.

(51) Int. Cl.
G06F 15/16 (2006.01)
H04L 29/08 (2006.01)
(Continued)

(52) U.S. Cl.
CPC ............ *H04L 67/26* (2013.01); *G06F 3/0482* (2013.01); *H04L 51/24* (2013.01); *H04L 51/32* (2013.01);
(Continued)

(58) Field of Classification Search
USPC ....... 709/203, 206, 217, 219, 223, 224, 226, 709/228, 230, 232, 238; 1/1
See application file for complete search history.

(56) References Cited

U.S. PATENT DOCUMENTS 7,370,290 B2    5/2008    Grossman et al.
7,433,920 B2    10/2008   Blagsvedt et al.
(Continued)

FOREIGN PATENT DOCUMENTS

WO    2013102914 A1    7/2013

OTHER PUBLICATIONS

Zarick, et al., "Person Centric Applications," U.S. Appl. No. 15/130,628, filed Apr. 15, 2016, 52 pages.
(Continued)

*Primary Examiner* — Quang N Nguyen
(74) *Attorney, Agent, or Firm* — Rainier Patents, P.S.

(57) ABSTRACT

A computer-implemented technique is described herein for presenting notifications on a user interface presentation of a recipient computing device. The technique is considered tiered because it distinguishes between first-type (people-centric) notifications and second-type notifications, and because it processes and presents first-type notifications in a privileged manner compared to the second-type notifications. For instance, the technique presents content associated with each first-type notification in an allocated window that appears in positional association with a person indicator, where that person indicator identifies the person who sent the first-type notification; the technique presents each sec-
(Continued)

ond-type notification in a different manner. In some implementations, an application developer who designs a custom first-type notification is given authority to draw within the allocated window that is used to present the custom first-type notification in a manner specified by the application developer.

20 Claims, 11 Drawing Sheets

(51) Int. Cl.
    *H04L 12/58*     (2006.01)
    *G06F 3/0482*     (2013.01)

(52) U.S. Cl.
    CPC .... *H04L 67/36* (2013.01); *G06F 2203/04803* (2013.01); *G06F 2203/04804* (2013.01)

(56) References Cited

U.S. PATENT DOCUMENTS

| | | | |
|---|---|---|---|
| 7,577,922 B2 | 8/2009 | Mann et al. | |
| 8,463,831 B2 | 6/2013 | Hanis et al. | |
| 8,584,031 B2 | 11/2013 | Moore et al. | |
| 8,805,450 B2 | 8/2014 | Wen et al. | |
| 8,918,339 B2 | 12/2014 | Rubinstein et al. | |
| 9,154,606 B2 | 10/2015 | Tseng et al. | |
| 9,450,905 B2* | 9/2016 | Aoyama | H04L 51/24 |
| 9,538,342 B2* | 1/2017 | Ramanujam | H04W 4/14 |
| 9,661,386 B2* | 5/2017 | Hampson | H04N 21/458 |
| 2006/0041848 A1 | 2/2006 | Lira | |
| 2008/0147795 A1* | 6/2008 | Heidloff | G06Q 10/107 709/204 |
| 2010/0011304 A1 | 1/2010 | van Os | |
| 2012/0222064 A1 | 8/2012 | Geer et al. | |
| 2014/0157138 A1 | 6/2014 | Kuscher et al. | |
| 2014/0344721 A1 | 11/2014 | Prakash | |
| 2014/0365917 A1 | 12/2014 | Luna et al. | |
| 2015/0089359 A1 | 3/2015 | Brisebois | |
| 2015/0160832 A1 | 6/2015 | Walkin et al. | |
| 2015/0286387 A1 | 10/2015 | Gu et al. | |
| 2015/0293757 A1 | 10/2015 | Hilerio et al. | |
| 2015/0350147 A1 | 12/2015 | Shepherd et al. | |
| 2015/0372959 A1 | 12/2015 | Velummylum et al. | |
| 2017/0216721 A1* | 8/2017 | Nomura | G06F 13/00 |

OTHER PUBLICATIONS

Mattox, et al., "Recipient-Based Content Sharing," U.S. Appl. No. 15/084,213, filed Mar. 29, 2016, 46 pages.
"People app help," available at <<https://support.microsoft.com/en-us/help/14103/windows-8-people-app-help>>, Microsoft Corporation, Redmond, WA, accessed on Dec. 14, 2016, 3 pages.
Mayo, Benjamin, "Everything new in iOS 10: New ways to communicate in Messages, Lock Screen Widgets, redesigned Music, Siri apps and much more," available at <<https://9to5mac.com/2016/09/13/everything-new-in-ios-10-new-ways-to-communicate-in-messages-lock-screen-widgets-redesigned-music-siri-apps-and-much-more/>>, 9to5mac.com, Sep. 13, 2016, 22 pages.
"Adaptive and interactive toast notifications," available at <<https://docs.microsoft.com/en-us/windows/uwp/controls-and-patterns/ties-and-notifications-adaptive-interactive-toasts>>, Windows Dev Center, Microsoft Corporation, Redmond, WA, Feb. 8, 2017, 28 pages.
"Microsoft Messaging," available at <<https://web-beta.archive.org/web/20170216215658/https://www.microsoft.com/en-us/store/p/microsoft-messaging/9wzdncrfibq6>>, Microsoft Store, Microsoft Corporation, Redmond, WA, Feb. 16, 2017, 5 pages.
Aisemberg, Adrian, "Providing Notifications with Response Options," U.S. Appl. No. 15/605,882, filed May 25, 2017, 48 pages.
Aisemberg, Adrian, "Providing Personalized Notifications," U.S. Appl. No. 15/605,884, filed May 25, 2017, 49 pages.
"New Official Chrome Hangouts Desktop Chat App with Improved UI," available at <<http://www.youmobile.org/blogs/entry/New-Official-Chrome-Hangouts-Desktop-Chat-App-with-Improved-UI-Download>>, YouMobile Inc., Oct. 10, 2014, 4 pages.
"Go SMS Pro," available at <<https://play.google.com/store/apps/details?id=com.jb.gosms>>, Googlle Play, Google Inc., accessed on Oct. 7, 2016, 4 pages.
"Taskbar," available at <<https://play.google.com/store/apps/details?id=com.rootuninstaller.taskbarw8>>, Googlle Play, Google Inc., accessed on Oct. 7, 2016, 4 pages.
Ladki, Aya, "Why GIFs are the Future of Communication," available at <<http://tedxryersonu.ca/gifs-the-future-of-commmunication/>>, published on Feb. 24, 2016, 4 pages.
Hess, et al., "Will Words Soon Be Replaced by GIFs? A Debate in Words and GIFs," available at <<http://www.slate.com/blogs/lexicon_valley/2015/05/11/are_gifs_the_future_of_communication_will_they_replace_words.html>>, Slate, May 11, 2015, 13 pages.
Fallon, Claire, "If You Have to Say It, Say It in GIFs," available at <<http://www.huffingtonpost.in/entry/gif-languagetrend_us_55affa6fe4b0a9b948538bde>>, Huffington Post, published on Feb. 12, 2016, 18 pages.
House, Tom, "MIT students use GIFs to connect language to emotion," available at <<http://college.usatoday.com/2014/05/17/mitstudents-use-gifs-to-connect-language-to-emotion/>>, USA Today, May 17, 2014, 5 pages.
Aguilar, Mario, "What are Mojis?," available at <<https://support.skype.com/en/faq/FA34582/what-are-mojis>>, Skype, Microsoft Corporation, Redmond, WA, accessed on Oct. 10, 2016, 6 pages.
"What Are Facebook Chat Heads?," available at <<http://gizmodo.com/5993646/what-are-facebook-chat-heads>>, Gizmodo, Apr. 4, 2013, 3 pages.
Screen Shot, available at <<https://scdn.androidcommunity.com/wp-content/uploads/2013/04/Screen-Shot-2013-04-04-at-10.30.14-AM-540x308.jpg>>, accessed on Nov. 27, 2016, 1 page.
Screen Shot, available at <<http://cdn.wccftech.com/wp-content/uploads/2015/01/notification-flottantes-chat-heads-whatapp-seebye.jpg>>, accessed on Nov. 27, 2016, 1 page.
Screen Shot, available at <<http://www.usethistip.com/wp-content/uploads/2014/06/chat-heads-830x450.png>>, accessed on Nov. 27, 2016, 1 page.

* cited by examiner

TIERED NOTIFICATION FRAMEWORK

This application claims the benefit of U.S. Provisional Application No. 62/409,871 (the '871 Application), filed on Oct. 18, 2016. The '871 Application is incorporated by reference herein in its entirety.

BACKGROUND

A computing device's operating system commonly uses a notification component to display notifications generated by applications. For instance, consider the case in which an Email application running on the computing device receives an Email message. The notification component typically displays some type of auto-expiring notification (such as a popup message) which indicates that the Email message has been received. A user may ignore the notification. Alternatively, the user may click on (or otherwise interact with) the notification. In response to the user's action, the computing device will typically activate the Email application and/or perform some other environment-specific operation.

While an end user may find notifications useful, there is also a risk that a heavy volume of such notifications can overwhelm the user and lead to poor user experience. The user may address this issue by ignoring the notifications or/and by disabling the notification component in whole or in part. This solution, however, defeats the original purpose of the notification component, which is to keep the user apprised of relevant occurrences affecting the user's applications in a timely manner.

SUMMARY

A computer-implemented technique is described herein for presenting notifications on a user interface presentation of a recipient computing device. The technique is considered tiered because it distinguishes between first-type (people-centric) notifications and second-type notifications, and because it processes and presents first-type notifications in a privileged manner compared to the second-type notifications.

In some implementations, the technique presents content associated with a particular first-type notification in an allocated window within the user interface presentation. The content of the first-type notification graphically conveys an association between the first-type notification and a person indicator. The person indicator, in turn, is associated with a sender user who has sent the particular first-type notification or who is otherwise associated with the first-type notification. The technique presents second-type notifications in a different manner compared to the first-type notifications.

In some implementations, the sender user may choose to send a first-type notification to the recipient user to express an emotion to the recipient user, e.g., through an animated emoji. In other implementations, a sender user may send the first-type notification as a part of a more encompassing intentional action, such as sending a gift to the recipient user. In other implementations, some other application and/or system event may trigger the generation of a first-type notification.

In some implementations, an application developer who designs a custom first-type notification is given authority to draw anywhere within the allocated window that will be used to present the custom first-type notification in a manner specified by the application developer.

Overall, the technique provides an effective and enjoyable way of directing the recipient user's attention to a subclass of notifications (corresponding to first-type notifications), within a potentially larger volume of other (second-type) notifications. This reduces the risk that the recipient user will overlook high-value notifications, such as notifications sent by users with whom the recipient user has a close relationship. Further, the technique provides an effective way by which application developers can customize certain notifications to achieve various objectives, such as creating application-branded notification experiences.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
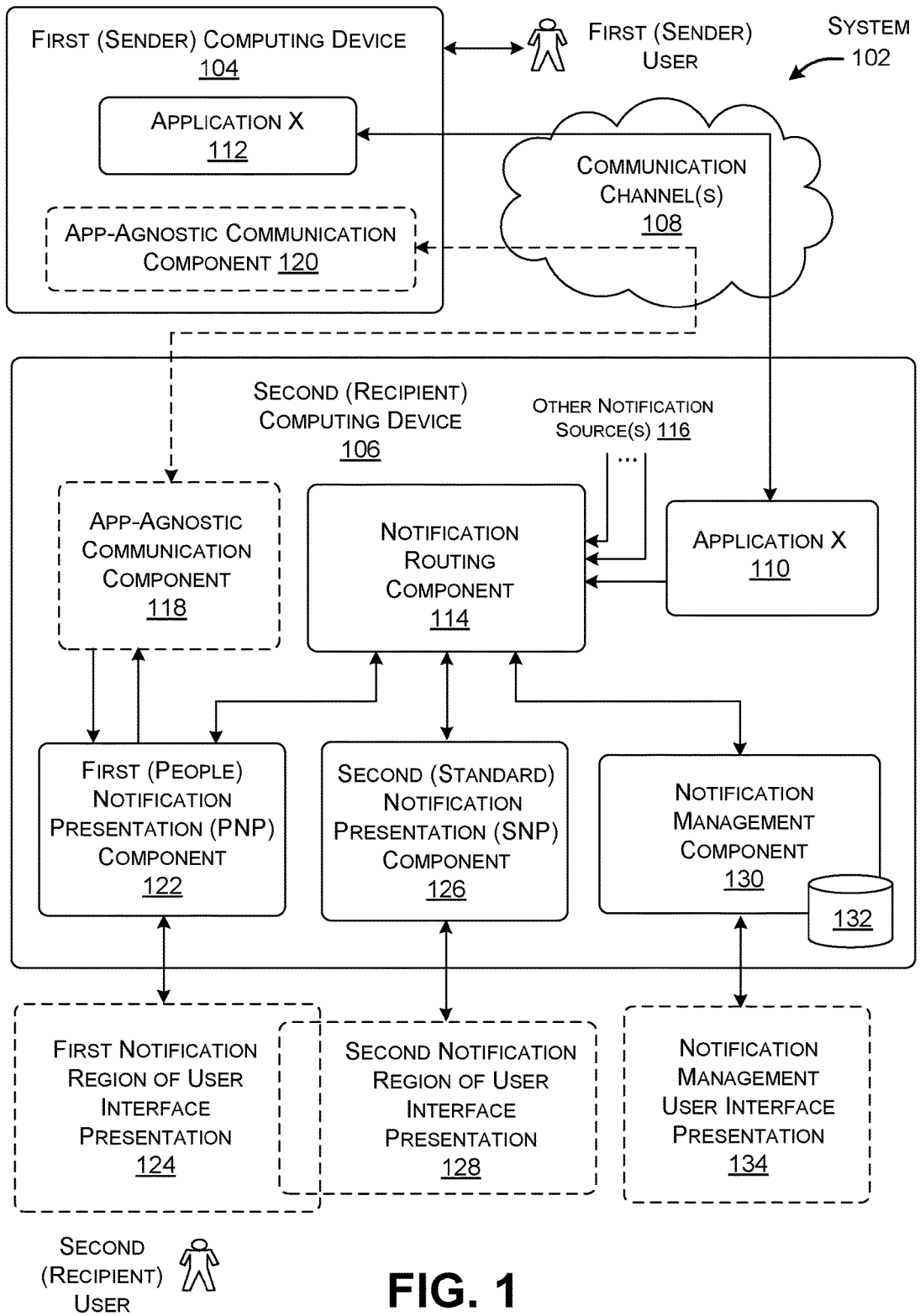
FIG. 1 shows a system for presenting notifications in a tiered notification framework.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for providing notifications in a tiered manner. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 for presenting notifications using a tiered notification framework. The system 102 is explained in the context of a representative first computing device 104 and a representative second computing device 106. The first (sender) computing device 104 corresponds to the source of some notifications produced in response to the intentional acts of a first (sender) user and/or other notification events. The second (recipient) computing device 106 receives the notifications produced by the sender computing device 104, among other notifications. A second (recipient) user consumes the notifications received by the recipient computing device 106. More generally, the system 102 can include many more sender computing devices and recipient computing devices, although not shown. Further note that any recipient computing device can also act as a sender computing device, and vice versa.

In other cases, an agent may send a notification to a recipient user on behalf of a sender user. For example, one person may operate the sender computing device 104 to send a notification on behalf of the sender user, such that the sender user is not the entity which actually triggers the sending of the notification. However, to facilitate and simplify explanation, the following description will emphasize the example in which the person operating the sender computing device 104 and the person who is designated as the sender of the notification correspond to the same individual.

The sender computing device 104 and the recipient computing device 106 can each correspond to any user computing device of any type, including, but not limited to: a stationary desktop computing device, a laptop computing device, any kind of handheld computing device (such as a smartphone), a game console, a set-top box, a wearable computing device, etc., or any combination thereof. The sender computing device 104 interacts with the recipient computing device 106 via one or more communication channels 108. The communication channel(s) 108 may entail use of a local area network, a wide area network (e.g., the Internet), one or more point-to-point links, etc., or any combination thereof.

FIG. 1 shows the illustrative components of the recipient computing device 106 with greater specificity compared to the sender computing device 104. But the sender computing device 104 can include the same components provided by the recipient computing device 106, although not specifically depicted in FIG. 1.

To begin with, the recipient computing device 106 can host one or more local applications that perform any respective functions. One such local application is illustrative application X 110. The sender computing device 104 likewise can host one or more local applications, including the illustrative application X 112. For example, the application X 110 running on the recipient computing device 106 can correspond to a first instance of a communication application (such as the SKYPE application provided by MICROSOFT CORPORATION of Redmond, Wash.), and the application X 112 running on the sender computing device 104 can correspond to a second instance of the communication application.

FIG. 1 shows that the application X 110 running on the recipient computing device 106 is entirely implemented by local functionality resident on the recipient computing device 106. While this depiction indeed represents one implementation, in other cases, any portion of the application X 110 can be implemented by remote computing functionality, such as a remote computing system (not shown) having one or more server computing devices. The same is true with respect to the application X 112 running on the sender computing device 104.

The recipient computing device 106 may receive notifications from various sources. For example, a notification routing component 114 can receive some notifications generated by the application X 110. For instance, the application X 112 running on the sender computing device 104 can send notifications to the application X 110 running on the recipient computing device 106, and the application X 110 can then forward the notifications to the notification routing component 114. The notification routing component 114 can also receive other notifications from other sources 116, such as other local applications (not shown) running on the recipient computing device 106. In this implementation, the applications therefore control the flow of notifications.

An application-agnostic communication component 118 can optionally receive other notifications. For instance, a complementary application-agnostic communication component 120 running on the sender computing device 104 can send notifications to the application-agnostic communication component 118 running on the recipient computing device 106. In some cases, the application-agnostic communication component 118 corresponds to an operating system component that entirely eliminates all use of third-party applications in performing its functions. For instance, the application-agnostic communication component 118 can use an operating system-driven transport mechanism to receive notifications. In other cases, the application-agnostic communication component 118 can correspond to an operating system component that makes use of one or more third-party communication applications as transport mechanisms for the notifications, but the operating systems of the sending computing device 104 and the recipient computing device 106 remain in ultimate control of the flow of notifications.

Overall, the recipient computing device 106 uses a tiered notification framework insofar as it discriminates between two or more types of notifications, and processes notifications in a type-specific manner. For instance, the recipient computing device 106 receives and processes at least first-type notifications and second-type notifications. Broadly, a first-type notification designates a kind of notification that the sender user or some other mechanism creates via the sender computing device 104 and/or some other mechanism(s), and which is earmarked as a special type of notification to be displayed by the recipient computing device 106 in a particular manner (described below). A second-type notification refers to any other notification other than a first-type notification. The recipient computing device 106 presents the second-type notification in a different manner compared to the first-type notification.

More specifically, the recipient computing device 106 presents each first-type notification in a manner which conveys the association between the first-type notification and the sender user who sent (or who is otherwise associated with) the first-type notification. The recipient computing device 106 displays each second-type notification without necessarily conveying a nexus between a sender user and the notification. For this reason, a first-type notification can be referred to as a sender-linked notification, while a second-type notification can be referred to as a standard notification.

To provide a concrete example, the sender user can intentionally create a first-type notification via the application X 112 or the application-agnostic communication component 120 for the purpose of conveying an emotion to the recipient user, e.g., via a static or animated emoji, digital photo, expressive character (e.g., a sticker), Internet meme, etc. The sender user may have a close relationship with the recipient user. Another notification source can provide a second-type notification to alert the recipient user to any other occurrence. For example, a home security application (not shown) can send a conventional second-type notification to the recipient user which alerts the recipient user to some security-related event, such as the fact the recipient user's garage door has been opened.

In one manner of operation, the notification routing component 114, upon receiving a notification, determines whether the received notification corresponds to a first-type notification or a second-type notification. In one implementation, the notification routing component 114 can make this determination based on an explicit identifier contained in (or otherwise inferable from) the received notification which identifies the type of the notification. In contrast, in one implementation, the application-agnostic communication component 118 may be configured to receive only first-type notifications, and therefore need not discriminate between first-type notifications and second-type notifications.

A first (people) notification presentation (PNP) component 122 presents first-type notifications in a first (people) notification region 124 of a user interface presentation. A second (standard) notification presentation (SNP) component 126 presents second-type notifications in a second (standard) notification region 128 of the user interface presentation. The people notification region 124 is distinct from the standard notification region 128. For example, the people notification region 124 may be associated with a first portion of a task bar provided by the user interface presentation, while the standard notification region 128 may be associated with a separate second portion of the task bar. In other cases, the first notification region 124 and the second notification region 128 can overlap to any extent; FIG. 1 conveys this point by showing overlapping labeled boxes associated with these respective regions.

A notification management component 130 can archive both first-type notifications and second-type notifications in a data store 132. The notification management component 130 also hosts a notification management user interface presentation 134 through which the recipient user can interact with archived notifications. In one implementation, the notification management user interface presentation 134 does not distinguish between first-type and second-type notifications. In another implementation, the notification management user interface presentation 134 includes indicators which make such a distinction.

In one implementation, all components of the recipient computing device 106, other than the application X 110, correspond to functionality implemented by the operating system of the recipient computing device 106. In other implementations, one or more of the depicted components of the recipient computing device 106 can be implemented by one or more applications.

Although not shown in FIG. 1, the recipient computing device 106 can include a configuration component that allows the recipient user to configure any aspect of its behavior. For example, the configuration component can allow the recipient user to enable or disable the first-type notification experience on a wholesale basis, or on an application-specific and/or user-specific basis, etc.

Figure 2:
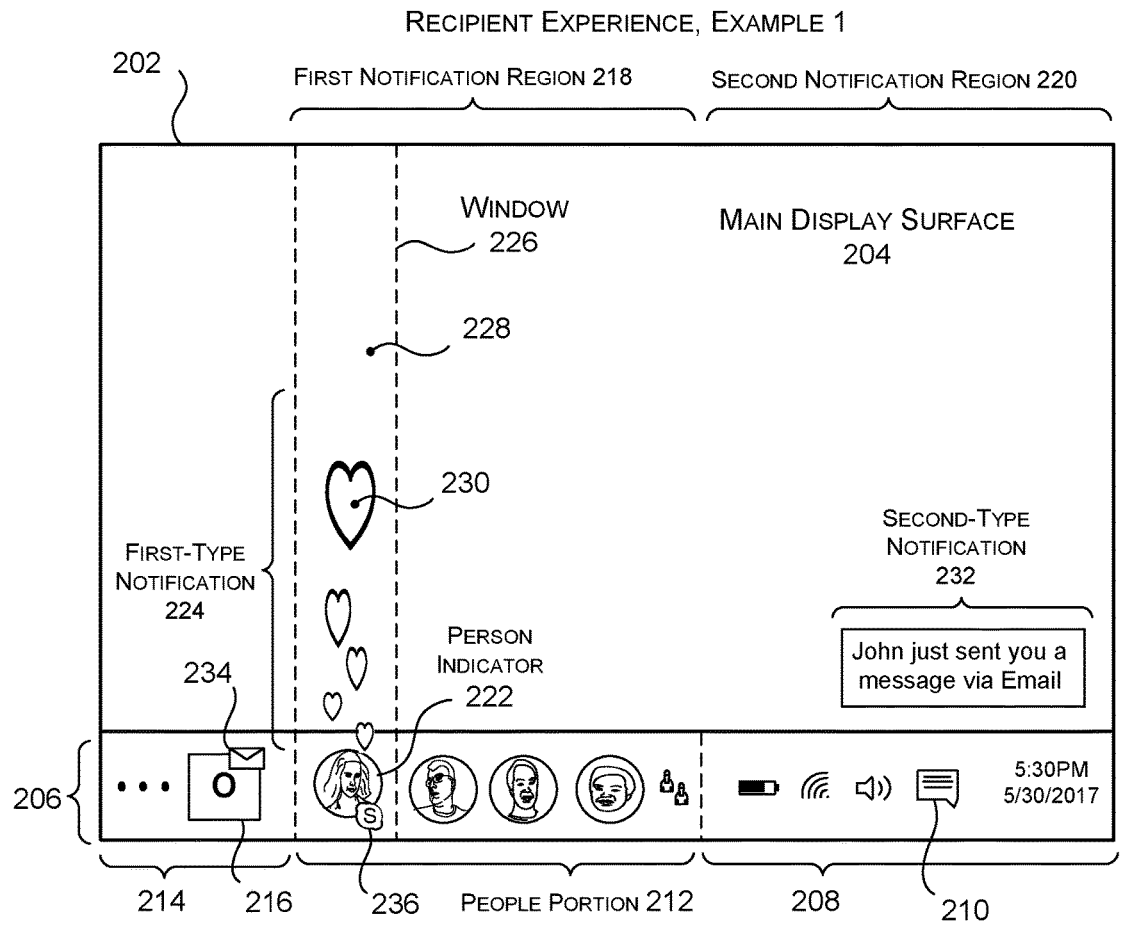
FIG. 2 shows a user interface presentation provided by a recipient computing device that displays a first-type notification provided by a sender computing device.

FIG. 2 shows a user interface presentation 202 provided by the recipient computing device 106 of FIG. 1. For example, in this merely illustrative case, the user interface presentation 202 may correspond to a home screen provided by the operating system of the recipient computing device 106. For instance, the user interface presentation 202 may represent the graphical desktop of a personal computing device, or the start screen of a mobile computing device (e.g., a smartphone), etc.

The user interface presentation 202 can include a main display surface 204 and at least one task bar 206. The task bar 206 is positioned at the periphery of the main display surface 204, such as at the bottom of the main display surface 204. In other implementations, the task bar 206 appears in any other part(s) of the user interface presentation 202 with respect to the main display surface 204. In other implementations, the user interface presentation 202 includes some other type(s) of task-related region(s) or graphical control/notification mechanism(s), instead of, or in addition to, a task bar.

The task bar 206 itself includes plural portions dedicated to displaying different kinds of information. A system tray portion 208 uses a set of system icons to convey general information regarding the status of the recipient computing device 106, such as the battery level, network connection status, speaker device status, etc. of the recipient computing device 106. The recipient user can control various aspects of the recipient computing device 106 by interacting with the system icons shown in the system tray portion 208.

In addition, the system tray portion 208 can provide a control feature 210 which allows the recipient user to interact with the notification management component 130. By doing so, the recipient user can activate the notification management user interface presentation 134, which enables the recipient user to inspect previously received second-type notifications.

A people portion 212 displays a set of person indicators associated with respective people who have a close relationship with the recipient user (as defined by the recipient user). For example, at any time, the recipient user can interact with the PNP component 122 to select the set of people. Thereafter, the PNP component 122 "pins" person indicators associated with these people to the people portion 212 of the task bar 206. As shown in FIG. 2, each person indicator may include information which identifies a particular person, such as a digital photograph of the particular person, an avatar associated with the particular person, a symbol associated with the particular person, etc.

Generally, the people portion 212 provides a convenient mechanism that allows the recipient user to interact with individuals associated with the displayed person indicators. For example, the recipient user can click on any person indicator in the people portion 212. In response, the PNP component 122 can present a control panel to the user. The control panel provides the recipient user with a set of options for interacting with the selected person, such as by sending a message to that person using the SKYPE application. In another use scenario, the recipient user may graphically drag a document in the main display surface 204 to a person indicator. In response, the PNP component 122 can transfer the document to the selected person through a default communication channel (such as via an Email message, SKYPE message, etc.).

The task bar 206 can also include any other portions, such as an application portion 214. The application portion 214 provides icons associated with applications provided by the recipient computing device 106, which the recipient user has previously pinned to the task bar 206. One such icon is icon 216.

The user interface presentation 202 can show both first-type notifications and second-type notifications. Without limitation, in one implementation, the user interface presentation 202 generally displays first-type notifications in a first notification region 218, which has a general positional relationship to the people portion 212 of the task bar 216. The user interface presentation 202 generally displays second-type notifications in a second notification region 220, which has a general positional relationship to the system tray portion 210 and/or the application portion 214 of the task bar 206. However, as noted above, in other implementations, the first notification region 218 can overlap the second notification region 220 to any extent. In another case, the first notification region 218 maps to any portion(s) of the task bar 206, and the second notification region 220 corresponds to an area that is generally located in one of the corners of the user interface presentation 202. Further note that the first notification region 218 can collectively refer to separate areas devoted to displaying first-type notifications. Likewise, the second notification region 220 can collectively refer to separate areas devoted to displaying second-type notifications.

More specifically, consider the specific example in which the PNP component 122 receives a first-type notification from a particular sender user. Assume that the first-type notification specifies content which corresponds to an animated heart emoji. Further assume that the particular sender user is already associated with a particular person indicator 222 within the people portion 212 of the task bar 206. In response to receiving the first-type notification, the PNP component 122 presents the content associated with the first-type notification in such a manner that conveys a nexus between the identity of the sender user and the content of the first-type notification. (As a matter of terminology, note that this description will sometimes use the phrase "presenting a notification" or the like as a shorthand reference to an operation of presenting content associated with a notification.)

For example, in one implementation, the PNP component 122 can present an animated heart emoji 224 in a display space directly above the person indicator 222. This manner of presentation visually conveys a graphical link between the sender user and the content of the first-type notification. That is, the recipient user will perceive the animated heart emoji 224 as bubbling up from the person indicator 222, strongly communicating to the recipient user that the sender user is sending him or her warm regards.

More generally stated, the PNP component 122 presents the content associated with a first-type notification in such a manner that the content graphically conveys a link between the first-type notification and that sender user's person indicator. In the above example, the PNP component 122 establishes the link by drawing the heart emoji 224 in proximity to the person indicator 222 on the user interface presentation 202. In another case, the PNP component 122 presents an animated emoji that travels a path across the user interface presentation 202 that graphically communicates the association between the emoji and the person indicator 222. For example, the PNP component 122 can display a swarm of hearts that float across the user interface presentation 202 while, at the same time, being progressively drawn closer to the person indicator 222, as if being sucked into a metaphorical drain defined by the person indicator 222.

The animated heart emoji 224 can be implemented in different ways, e.g., as an animated Graphics Interchange Format (GIF) content item, an Animated Portable Network Graphics (APNG) content item, etc.

In other examples (not shown), the PNP component 122 can present other types of information above a person indicator, depending on the payload provided by a particular first-type notification, including any types of static and/or dynamic content items. Examples of other content items include, but are not limited to: text messages, images (e.g., digital photographs), video snippet items (e.g., "mojis"), graphical items, etc. In addition, or alternatively, the PNP component 122 can convey some aspects of a first-type notification in audio form, haptic form, etc., or any combination thereof, depending on the kind(s) of content items that are specified in the payload of the first-type notification.

In some implementations, the PNP component 122 creates the experience shown in FIG. 2 by presenting a window 226 that has been allocated, in advance, for use in showing first-type notifications associated with the person indicator 222. The window 226 can have any shape, position, dimensions, and behavior. In some implementations, the window 226 corresponds to a ribbon which extends from the person indicator 222 to the top of the user interface presentation 202; that ribbon has a horizontal extent which at least spans the width the person indicator 222. Although not shown, the PNP component 122 can allocate other windows to other respective person indicators in the people portion 212. Each such window can take the form of a ribbon which extends up from an associated person indicator to the top of the user interface presentation 202. Generally note that the display surface defined by any such window extends beyond the boundary associated with the task bar 206, thereby accommodating a first-type notification experience which bleeds outside the bounds of the task bar 206.

The first notification region 218 therefore corresponds to the aggregate of the windows which extend from the respective person indicators into the main display area 204. But with respect to any specific first-type notification (and an associated person indicator associated with the sender of that first-type notification), the first notification region 218 corresponds to just one of the windows, such as the window 226.

In the example of FIG. 2, the PNP component 122 can allocate non-overlapping windows to the different person indicators. But in other cases, the PNP component 122 can allocate windows that overlap at least to some extent. Further, the PNP component 122 can stagger the presentation of received first-type notifications in such a manner that these notifications will not interfere with each other on the user interface presentation 202. Or the PNP component 122 can display a last-received first-type notification on top of a previously-received first-type notification.

The window 226 presents the animated heart emoji 224 on a transparent background. The transparent background reveals whatever content is provided on a display surface which lies beneath the window 226. Further, the PNP component 122 is configured to pass any clicks (or other actions, such as taps) that the recipient user directs to the transparent background to a display surface which lies beneath the transparent background. For instance, assume that the PNP component 122 detects that the recipient user clicks on a point 228 in the window 226, corresponding to a part of the transparent background of the window 226. In response, the PNP component 122 can direct the user's input action to whatever display surface lies beneath that point 228, for processing by any event handler associated therewith. In contrast, assume that the PNP component 122 detects that the recipient user clicks on a point 230 on the heart emoji 224 itself, e.g., by "chasing" the moving heart emoji 224 with a mouse device and clicking on one of the hearts. In response, the PNP component 122 can perform any environment-specific action, such as by activating the application through which the first-type notification has been received, or by dismissing the first-type notification, etc. The PNP component 122 can process clicks directed to overlapping windows in a conventional manner, e.g., by consulting a data store which provides information regarding the manner in which windows overlap each other within the user interface presentation 202, for each point on the user interface presentation 202.

Other windows can have other dimensions and/or other behaviors compared to window 226 shown in FIG. 2. For example, in another case, the window 226 can have a height dimension that does not reach to the top of the user interface presentation 202. In another case, the window 226 has a width that spans plural person indicators, such that the respective windows associated with different sender users overlap in the manner described above. Indeed, the PNP component 122 can display the content of a first-type notification (associated with a particular sender user) on a window that encompasses the entire display surface of the user interface presentation 202. This means that the PNP component 122 can display first-type notifications for the sender user anywhere in the user interface presentation 202, while still conveying a graphical nexus between each notification and the sender user's person indicator. In another case, the window 226 can have a nexus with a particular person indictor without necessarily being placed directly above the person indicator in the manner shown in FIG. 2. In another case, a window can incorporate any combination of the variations described above.

In other implementations, the PNP component 122 behaves as described above, but the person indicators can appear in any other part(s) of the user interface presentation 202 besides, or in addition to, the task bar 206.

In still other implementations, the PNP component 122 can display a first-type notification in such a manner that conveys an association with a person indicator, but the person indicator no longer has a fixed position within the user interface presentation 202. For example, the PNP component 122 can display the first-type notification along with an associated person indicator at any position within the user interface presentation 202, and that position can change over time.

In still other implementations, the PNP component 122 can display a first-type notification in a display region associated with the sender of the first-type notification, but without also displaying a person indicator associated with that sender. For example, assume that the upper left quadrant of the user interface presentation 202 is associated with a particular sender user. The recipient user may interpret a first-type notification that is presented in the upper left quadrant as originating from the particular sender user, without being explicitly informed by the PNP component 122 via the presentation of a person indicator associated with that sender user. Hence, a "person indicator," as the term is broadly used herein, can refer to any aspect of the user interface presentation 202 that is associated with a sender user, not necessarily an explicit icon, picture, avatar, etc.

Next assume the SNP component 126 receives a second-type notification from an Email application that informs the recipient user that a particular sender user has sent him or her an Email message. The SNP component 126 can display a second-type notification 232 near the system tray portion 210, which alerts the recipient user to the receipt of the Email message. The SNP component 126 (or the Email application itself) can also display an icon 234 in the application portion 214 which alerts the recipient user to the same event. Note that a second-type notification is unlike a first-type notification because it does not necessarily have a positional relationship with respect to a person indicator.

Note that a sender user can choose, at any given time, to communicate with a recipient user via a first-type notification or a second-type notification. A first-type notification invokes the first-type notification experience described above, while a second-type notification invokes the second-type notification experience described above. The first-type notification experience can be considered privileged over the second-type notification experience because it is more apt to draw the attention of the recipient user compared to the second-type experience, e.g., because it has a stronger association with a particular sender user, and it generally provides a more dramatic effect on the user interface presentation 202.

The system 102 allows a sender user (and/or any other notification-creation mechanism) to create a first-type notification, such as the animated heart emoji 224 shown in FIG. 2, using at least two strategies. In a first strategy, the system 102 provides a set of predetermined dynamic first-type notification experiences associated with respective emojis (and/or other content items). Respective executable content items (e.g., APNG items) implement these dynamic notification experiences. In operation, the sender user can select a desired first-type notification experience by selecting the emoji associated with the experience. For example, the sender user can select the dynamic bubbling heart experience shown in FIG. 2 by selecting a heart emoji via the application X 112. To execute the bubbling heart experience, the PNP component 122 calls on a pre-stored executable content item which implements this experience, such as a pre-stored APNG item. In other words, in the example of FIG. 2, the heart emoji that the sender user selects serves as a shorthand visual representation of the dynamic bubbling heart experience that will be delivered to the recipient user.

In other cases, the content item that the sender user selects encapsulates the entire notification experience that is delivered to the recipient user. For instance, the sender user may select a static content item (e.g., a static heart emoji), and the recipient computing device 106 delivers that same static content item.

Each recipient computing device can store a copy of a set of whatever content items are used to deliver the notification experience, such as by providing a set of executable content items associated with respective selectable emojis. More generally, each recipient computing device is given access to the set of pre-stored content items that will deliver the associated experiences when invoked, wherever these items happen to be stored.

Further, a sender user can obtain a set of predetermined emojis (or other content items) from a central repository of such information. For example, a sender user may purchase or otherwise obtain a set of emojis from an online marketplace. In one case, these emojis are associated with respective first-type notification experiences that are provided by respective executable content items. The online marketplace also provides the corresponding executable content items that provide the notification experiences.

In a second strategy, the system 102 grants an application developer the right to freely draw anywhere within an allocated window (such as the allocated window 226 of FIG. 2) in any manner chosen by the application developer, rather than utilizing predetermined system-provided or vendor-provided experiences. In other words, in the second case, the system 102 treats a display surface of the window as an open-ended "blank" canvas; it relies on the application developer to determine what information is presented on this display surface, how that information is presented on the display surface (e.g., what format is used to present the information), and how that information behaves when the recipient user subsequently interacts with it. The application developer creates such an experience by designing a particular type of first-type notification for presentation in the window, e.g., by designing a particular content item that will deliver the experience. The item can correspond to a static content item (e.g., a static emoji), a dynamic content item (e.g., an executable APNG item), etc. As in the first scenario, a dynamic content item designed by the application developer may be associated with a representative static content item (e.g., a static emoji). The sender user chooses a desired notification experience by selecting its counterpart static content item.

An application developer can provide a content item associated with a newly created first-type notification experience to each recipient computing device, for advance storage by the recipient computing device. This provision will ensure that a recipient computing device can provide the first-type experience when it is invoked. Or, more generally, the application developer can store the content item at a storage location that is accessible to each recipient computing device. In yet another case, the first-type notification itself can convey the content item.

An application developer may choose to control a window in the above-described manner in order to produce a branded notification experience. A branded notification experience alerts the recipient user to the fact that a corresponding first-type notification emanates from a particular application. A branded notification experience can also entice the recipient user to perform specific actions, such as downloading an application or an application component, making a purchase, etc. In the merely illustrative case of FIG. 2, the application developer can create an executable content item that governs the movement of the hearts within the window 226. The application developer also provides a logo indicator 236 in proximity to the person indicator 222, which informs the recipient user as to the application-related origin of the animated heart emoji 224.

Figure 3:
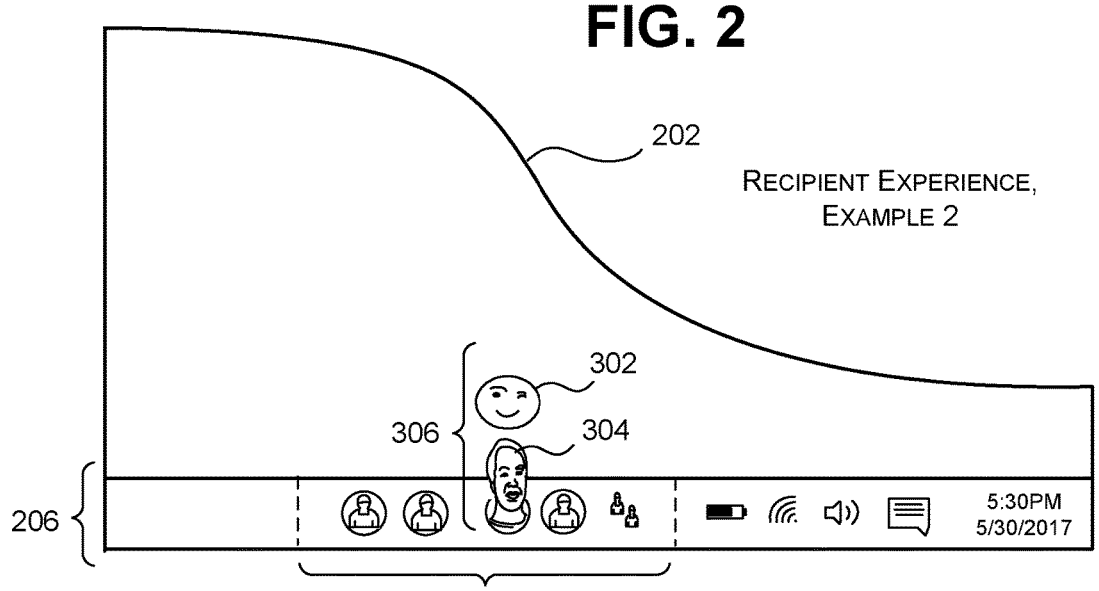
FIG. 3 shows another way that a recipient computing device can display a first-type notification.

FIG. 3 shows another way that the PNP component 122 can display a first-type notification. In this case, the sender user selects a winking emoji experience by selecting a static winking emoji. Upon receipt, the PNP component 122 presents an animated winking emoji 302 above a particular person indicator 304. The person indicator 304 identifies the sender of the first-type notification. In addition, the PNP component 122 modifies the person indicator 304 so as to more effectively direct the recipient user's attention to the emoji 302, e.g., by enlarging the person indicator 304 such that it extends outside the bounds of the task bar 206. Collectively, the emoji 302 and the modification to the person indicator 304 constitute a first-type notification experience 306 provided by the PNP component 122. More generally, the PNP component 122 can change any visual and/or behavioral attribute of a person indicator. The PNP component 122 can selectively modify other parts of the user interface presentation 202 in a like environment-specific manner.

Figure 4:
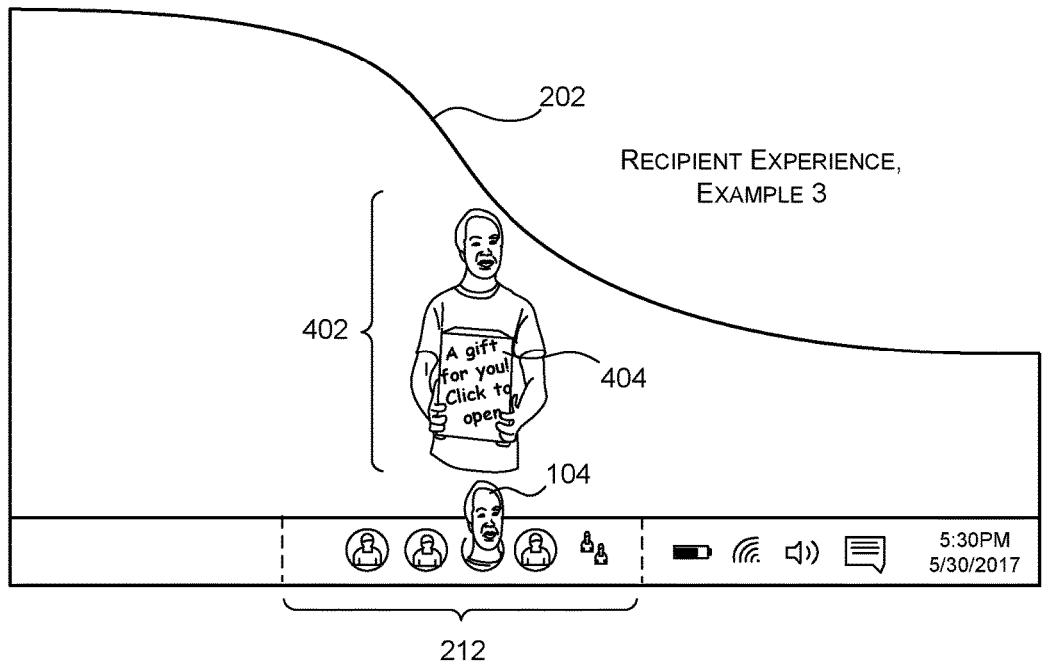
FIGS. 4 and 5 show one way in which a recipient computing device can display a first-type notification to a recipient user in conjunction with conferring a gift to the recipient user.
Figure 5:
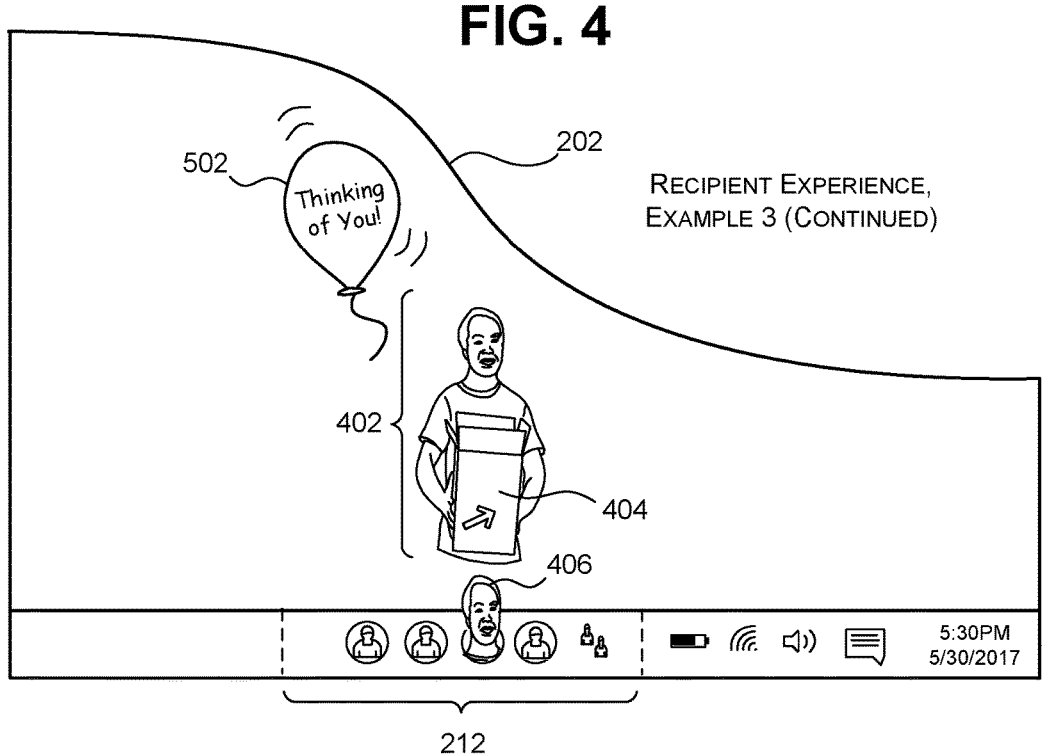

FIGS. 4 and 5 show a more elaborate notification experience provided by the PNP component 122. Starting with FIG. 4, assume that the sender user interacts with a gift-gifting application (not shown) to purchase or otherwise select a gift for the sender user. For example, the sender user may select a digital movie or song for the recipient user. In some cases, the gift has an established monetary value. For example, a digital song has a purchase price within a marketplace of songs. In other cases, the gift primarily has an emotive value. For example, the gift may correspond to a custom graphical object created by the sender user with no fixed monetary value.

In the illustrative case of FIG. 4, the recipient user has selected a digital greeting card which consists of an animated balloon. A gift-giving application can also optionally allow the user to customize the gift, such as by adding a personalized inscription to the gift, or designing the features of the gift. For instance, the gift-giving application can allow the sender user to design a three-dimensional rendering of a teddy bear by choosing its various features from a menu of such features. In the merely illustrative case of FIGS. 4 and 5, the sender user has chosen a personalized message to be displayed on a three-dimensional balloon, reading, "Thinking of you!" When the sender user completes a gift order and issues a "send" command, the gift-giving application forwards a first-type notification to the recipient computing device 106.

Upon receipt of the first-type notification, the PNP component 122 can present a notification experience that depends on the environment-specific payload of the first-type notification. In one illustrative case, assume that the PNP component 122 initially presents a visual representation 402 of a gift-giver on the user interface presentation 202. The visual representation 402 depicts a user holding an unopened package 404, bearing the message "A gift for you! Click to open." The PNP component 122 presents the visual representation 402 immediately above the person indicator 406, associated with the sender user (who has conferred the gift). In addition, for an appropriately configured first-type notification, the PNP component 122 can enlarge the person indicator 406, or otherwise draw the recipient user's attention to the person indicator 406 by changing one or more of its visual attributes. In addition, for an appropriately configured first-type notification, the PNP component 122 can optionally paste a digital image of the sender user's face on the visual representation 402 of the gift-giver. This will reinforce the recipient user's understanding that a particular person is giving the recipient user a present.

Advancing to FIG. 5, assume next that the recipient user clicks on, taps on, or other otherwise selects the package 404 in the visual representation 402. In response, the PNP component 122 updates the visual representation 404 to indicate that the package 404 has been opened. The PNP component 122 can also display an animated representation of a balloon 502, which escapes from the package 404 and floats over the main display surface 204. The balloon 502 bears the message selected by the sender user. The PNP component 122 can implement the first-type user experiences shown in FIGS. 4 and 5 using any animation technology, such as by using an appropriately configured dynamic content item, such as an APNG item.

Other application providers can allow sender users to create other types of gift delivery experiences. In another case, for example, upon virtually unwrapping a gift, the PNP component 122 will reveal a digital media asset that has been given to the recipient user. The PNP component 122 can then provide control features which allow the recipient user to play or archive the media asset. In another case, upon virtually unwrapping a gift, the PNP component 122 will reveal a three-dimensional object designed by the sender user, such as a three-dimensional rendering of a teddy bear. The PNP component 122 can then provide control features that allow the recipient user to interact with that object, such as by rotating the object, redesigning it, etc. The PNP component 122 can also allow the recipient user to send a thank you notification to the recipient user, which constitutes a first-type notification in its own right to be presented by the sender computing device 104.

In another use scenario, a person may act as an agent of the gift-giver by creating or purchasing a gift on behalf of the gift-giver. In that case, the first-type notification will continue to represent the gift-giver, but the gift-giver is not the person who has interacted with the sender computing device 104 to procure and send the gift.

FIGS. 4 and 5 also serve to make two general points. As a first general point, note that a sender user can intentionally trigger the sending of a first-type notification in different circumstances. In one case, the sender user sends a first-type notification when he or she explicitly selects an emoji or other content item to be presented in the first-type notification. In a second case, the sender user performs an action (such as designing and sending a gift), part of which involves sending a first-type notification to the recipient user. Here, in other words, the triggering event is a part of a larger intentional act.

In a third case, a mechanism within the system 102 may automatically perform an operation which involves, as at least part thereof, sending a first-type notification to the recipient user. The first-type notification in this case remains associated with the sender user, but the sender user may or may not be aware of the fact that the first-type notification has been sent. For instance, consider the scenario in which both the sender user and the recipient user are fans of a particular team. The sender user may configure a news feed application such that it sends a first-type notification to a friend when it is reported that the team has won a game; here, the sender user can be said to only have indirectly invoked the sending of the first-type notification.

In another scenario, the sender user or some other mechanism may trigger the sending of a notification to a recipient user without specifying that the notification should be sent as a first-type notification. An application or an operating system component can automatically promote this notification to a first-type status, with or without asking for confirmation from the sender user. The application or operating system component can perform this operation based on one or more environment-specific factors, e.g., depending on the contents of the notification, the identity of the recipient user, the preferences of the recipient user, etc.

In general, then, the system 102 can be said to send a first-type notification in response to some notification event, where that notification event may or may not reflect a direct intentional action by the sender user. To nevertheless facilitate explanation, the examples which follow will continue to emphasize the non-limiting case in which the sender user explicitly invokes the sending of the first-type notification, e.g., so as to convey an emotion to someone with whom the sender user has a close relationship.

As a second general point, FIGS. 4 and 5 illustrate that any first-type notification experience can involve interaction with the recipient user in any manner. A first-type notification experience does not stop in these cases after presentation of an emoji or the like.

Figure 6:
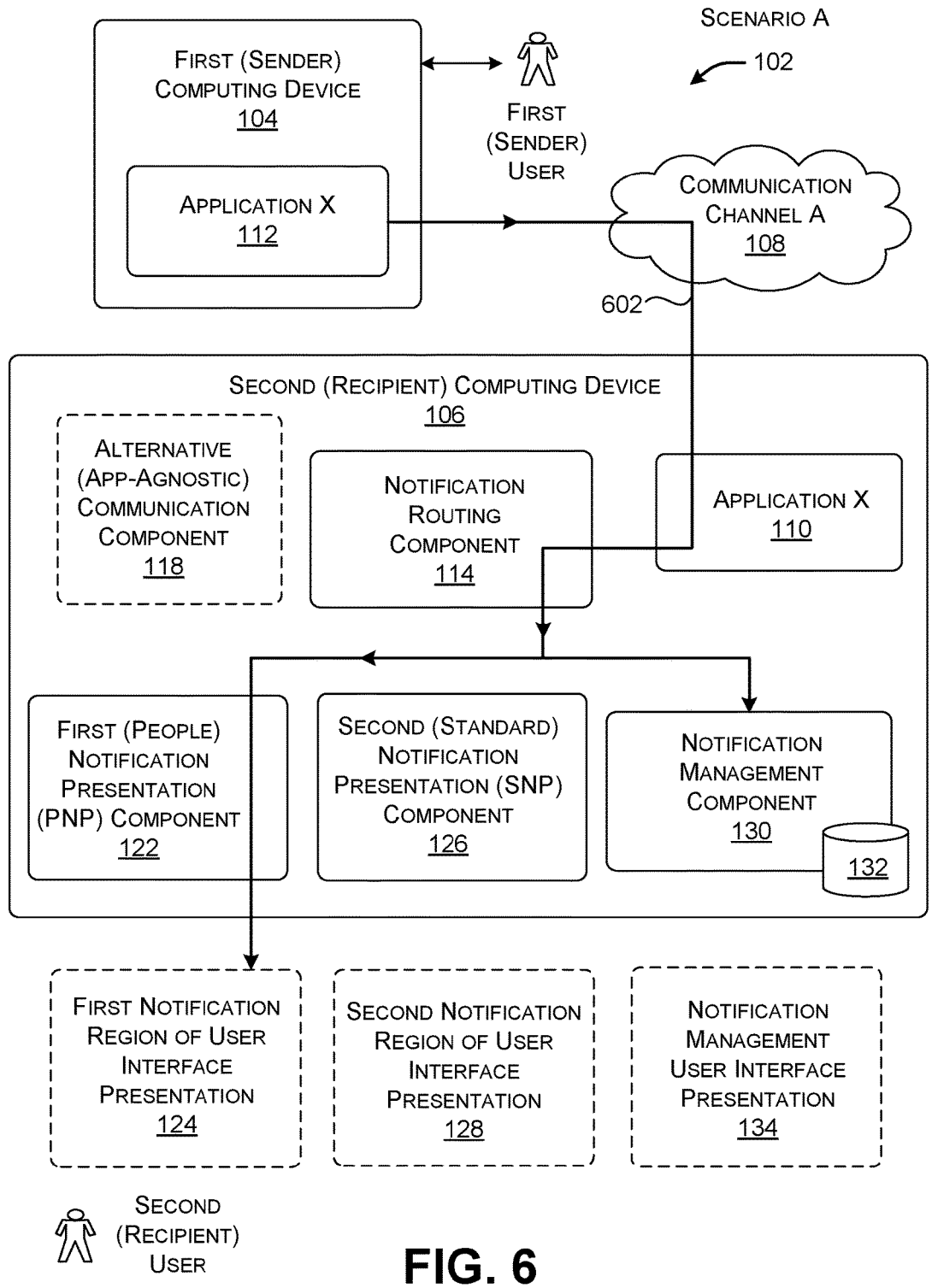
FIG. 6 shows a path for delivering a first-type notification to a recipient user, corresponding to a first implementation of the system of FIG. 1.

FIG. 6 shows a depiction of the system 102 of FIG. 1 that highlights a first delivery path 602 of a first-type notification, corresponding to a first implementation of the system 102. In this implementation, the sender user interacts with the application X 112 of the sender computing device 104 to create a first-type notification. The application X then sends the created first-type notification to a counterpart instance of the application X 110 on the recipient computing device 106, via a communication channel A. The application X 110 then uses an API to forward the first-type notification to the notification routing component 114.

The notification routing component 114 determines whether the received notification is a first-type notification or a second-type (standard) notification. To repeat, a first-type notification is a notification that the sender user intentionally creates with the goal of invoking the above-described services of the PNP component 122, rather than the SNP component 126. Upon determining that the received notification is a first-type notification (e.g., which can be gleaned based on an explicit identifier in the first-type notification), the notification routing component 114 sends the first-type notification to the PNP component 122. The notification routing component 114 also optionally forwards the first-type notification to the notification management component 130 for archiving in the data store 132.

The PNP component 122 then presents the first-type notification in the people notification region 124 of the user interface presentation in any of the ways described above, as dictated, in part, by the nature of the content of the first-type notification.

Although not shown, assume that the recipient computing device 106 next receives a second-type notification, corresponding to a non-privileged standard notification. The notification routing component 114 determines that the received notification is a second-type notification, upon which it forwards the second-type notification to the SNP component 126. The SNP component 126 presents a second-type notification in the standard notification region 128 of the user interface presentation. The notification routing component 114 also sends the second-type notification to the notification management component 130 for routing in the data store 132.

Figure 7:
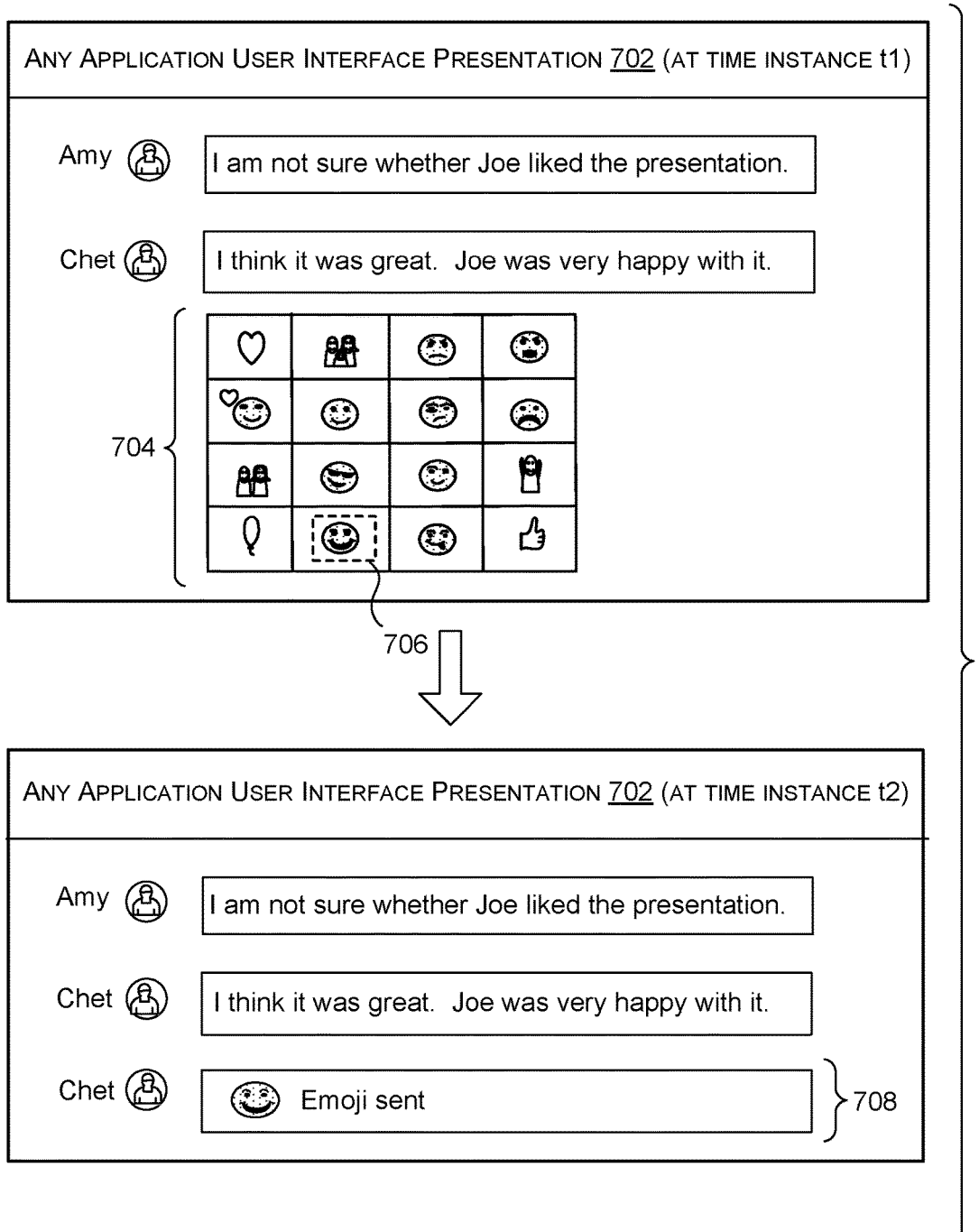
FIG. 7 shows an illustrative user interface presentation through which a sender user can create a first-type notification, in conformance with the first implementation of FIG. 6.

FIG. 7 shows a user interface presentation 702 through which the sender user may create the first-type notification shown in FIG. 6, in the course of interacting with the application X 112. Assume that the application X 112 corresponds to a communication application, and that the sender user (Chet) is currently engaged in a text-driven chat session with the recipient user (Amy). At some juncture in the conversation, assume that the sender user interacts with a control feature (not shown) provided by the application X 112 to invoke a panel 704 of emojis from which the recipient user may choose. These emojis may correspond to application-specific emojis that an application developer (associated with application X 112) has created for use with the application X 112. Or the emojis can correspond to application-agnostic emojis that are available for use in conjunction with many different applications. In both cases, the system 102 stores a dynamic or static content item associated with each emoji. The PNP component 122 executes a particular first-type notification experience by providing a corresponding static content item, or executing a corresponding dynamic content item.

Assume that the sender user selects one particular emoji 706 from the panel 704. In response, as shown in message 708 at the bottom of FIG. 7, the application X 112 informs the sender user that the notification experience associated with the emoji 706 has been sent to the recipient user.

Figure 8:
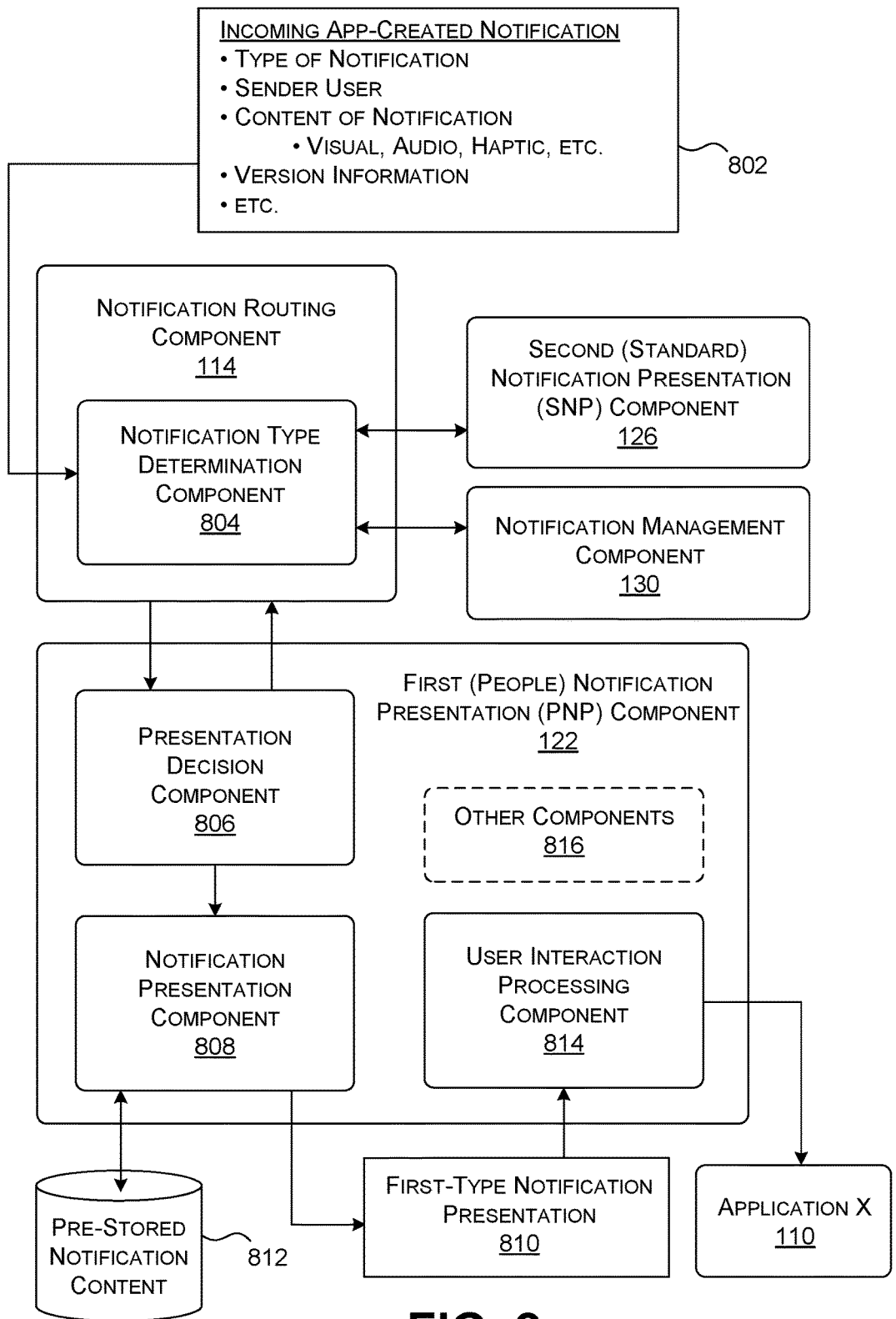
FIG. 8 shows further illustrative details of the first implementation of FIG. 6.

FIG. 8 shows further illustrative details of the first implementation of FIG. 6. In this case, assume that the first-type notification 802 includes various fields of information. For example, the first-type notification 802 includes a first identifier (e.g., first metadata) which explicitly identifies the first-type notification 802 as a first-type notification. The first-type notification 802 can optionally include a second identifier which specifies the identity of the sender user. The first-type notification 802 also includes a content payload that describes the consumable content of the first-type notification 802. That is, the content payload can specify visual content (static and/or animated), audio content, haptic content, etc., or any combination thereof. Collectively, the consumable content corresponds to a content item.

In some cases, the content payload provides a reference to a location (or locations) where the content be found. In other cases, the content payload provides the actual content item associated with the first-type notification 802. For example, the content payload can describes the storage location where an APNG item can be found, or it can provide that APNG item itself within its body. The first-type notification 802 can optionally include version information which specifies a version of the first-type notification 802. Although not shown, the first-type notification 802 can also optionally include an identifier which conveys the application (if any) from which the first-type notification 802 originated.

In alternative cases, described below, one or more information items of the first-type notification 802 can be inferred, rather than explicitly specified by the first-type notification 802 itself.

The notification routing component 114 includes a notification type determination component 804 for determining that the received notification is a first-type notification rather than a second-type notification. The notification type determination component 804 can make this decision based on an explicit identifier in the first-type notification 802. In other cases, the notification type determination component 804 infers that the first-type notification 802 is a first-type notification. For example, the notification type determination component 804 can interpret notifications that originate from particular applications and/or from particular users, etc. as first-type notifications, regardless of what identifiers are included in those notifications. In another case, the notification type determination component 804 interprets notifications sent by users who are currently pinned in the people notification region 214 as first-type notifications, regardless of what identifiers are included in those notifications. In any event, upon determining that the received notification is a first-type notification, the notification routing component 114 forwards the first-type notification to the PNP component 122.

The PNP component 122 includes a presentation decision component 806 for determining whether or not the first-type notification can be presented as a first-type notification. To perform this task, the presentation decision component 806 first determines whether the sender user that is identified in the first-type notification 802 is included within the set of person indicators in the people portion 212. The presentation decision component 806 can alternatively, or in addition, infer the identity of the sender user, rather than relying on explicit information specified in the first-type notification 802. For example, the presentation decision component 806 can infer the identity of the sender user based on an address from which the first-type notification 802 has been received, etc.

The presentation decision component 806 can also make reference to a set of user-configurable context-specific rules. One such rule can instruct the PNP component 122 to present a first-type notification only when the recipient user is currently active on the recipient computing device 106. The presentation decision component 806 can determine that the recipient user is not active when no input has been received from the recipient user for more than a prescribed amount of time.

Another rule can instruct the PNP component 122 to only present a first-type notification when the recipient user has not disabled the PNP component 122. The recipient user may disable the PNP component 122 in a wholesale manner, or with respect to individual users and/or applications. In other cases, the recipient computing device 106 can entirely lack the PNP component 122.

Another rule can instruct the PNP component 122 to present a first-type notification only when that notification is determined to be sufficiently timely, as defined by any environment specific measure of timeliness. For example, assume that the PNP component 122 suspends the presentation of a first-type notification because the recipient user is not currently interacting with the recipient computing device 106. Upon the recipient user's return to the recipient computing device 106, the PNP component 122 will present the first-type notification only if the amount of time that has elapsed since the receipt (or creation) of the first-type notification does not exceed an environment-specific threshold value.

Another rule or set of rules can govern the presentation of the first-type notification with respect to different contextual factors associated with the people portion 212. For example, one rule can instruct the PNP component 122 to present a first-type notification only when that notification pertains to a sender user who is currently pinned to the people portion 212. An alternative rule can instruct the PNP component 122 to present a first-type notification when the sender user is known to the application through which the notification has been received, although that sender user may not be currently pinned to the people portion 212. Still other rules can provide yet more relaxed conditions that specify when a first-type notification may be presented.

In yet other cases, the presentation decision component 806 explicitly asks the user whether he or she wishes to accept a first-type notification from a particular sender user. The presentation decision component 806 can also include a learning component which learns the user's repeated responses to such questions. The presentation decision component 806 can create a learned presentation rule when a behavioral pattern is detected by the learning component with a sufficient degree of confidence, as defined by an environment-specific threshold value.

Another rule can govern the handling of a first-type notification that cannot be presented as a first-type notification for any of the reasons described above. For example, such a rule can specify that a thwarted first-type notification should be presented as a second-type notification in the standard notification region 128. Another rule can elevate a second-type notification to a first-type notification when one or more environment specific factors are met.

Another rule can govern the manner in which multiple first-type notifications are handled when such notifications are received close together in time. For example, one such rule instructs the PNP component 122 to place the received first-type notifications in a queue. The PNP component 122 can then present the first-type notifications in the order in which they have been received. The PNP component 122 can optionally stagger the presentation of the first-type notifications in such a manner that no two notifications interfere with each other on the user interface presentation. Yet another environment-specific rule can allow one first-type notification to overlap with another first-type notification.

Next consider the scenario in which the PNP component 122 makes a decision to present a first-type notification for which a corresponding person indicator does not currently exist in the people portion 212. In one implementation, the PNP component 122 can add the corresponding person indicator to the people portion 212 prior to displaying the first-type notification. That person indicator thereafter remains in the people portion 212 after the first-type notification is presented. In another implementation, the PNP component 122 can display a temporary person indicator in the people portion 212 at the same time as it displays the first-type notification. The PNP component 122 can remove the temporary person indicator along with the first-type notification itself.

A notification presentation component 808 displays a first-type notification presentation 810 when instructed by the presentation decision component 806. To do so, the notification presentation component 808 may optionally use reference information specified in the first-type notification to access content in a local and/or remote data store 812.

A user interaction processing component 814 receives input signals that indicate that the user has interacted with the first-type notification presentation 810. When such an input action is detected, the user interaction processing component 814 can perform an environment-specific action, such as by activating the application X 110 associated with first-type notification presentation 810, and/or interacting with any other component.

Next consider the scenario in which a recipient computing device 106 receives a notification created by a particular application on the sender computing device 104, but the recipient computing device 106 itself lacks a local instance of the particular application. In that case, the notification routing component 114 can directly receive the first-type notification from the sender computing device 104. Further, the PNP component 122 can offer the recipient user the option of obtaining a local instance of the application. The PNP component 122 can convey such an invitation as part of the first-type notification experience, e.g., when the recipient user attempts to click on a presented first-type notification.

FIG. 8 also shows that the PNP component 122 can include other components 816 which are not directly relevant to this disclosure. For instance, the other components 816 can include functionality that allows a user to manage the set of people identified in the people notification region 214 of the user interface presentation 202.

Figure 9:
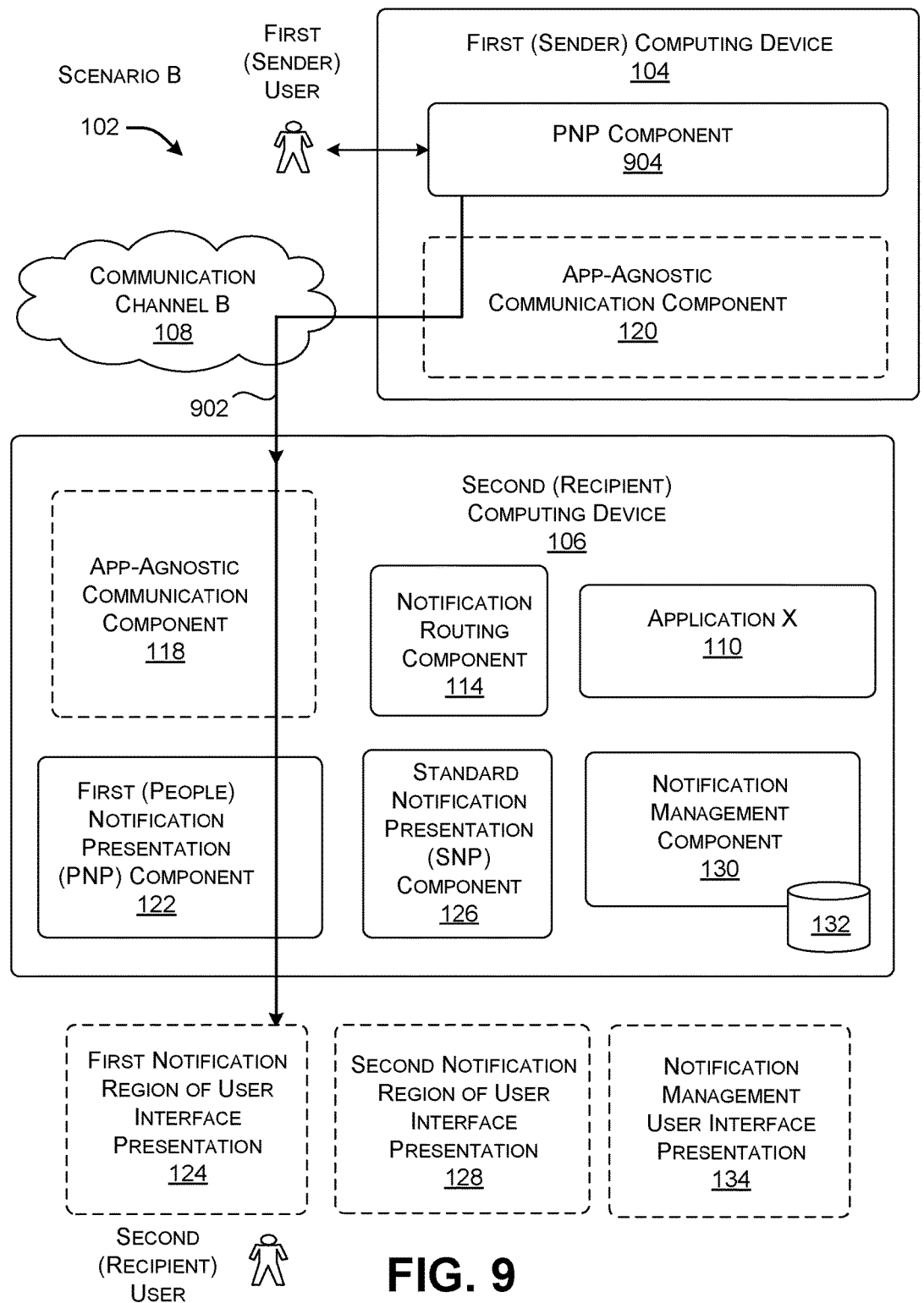
FIG. 9 shows a path for delivering a first-type notification to a recipient user, corresponding to a second implementation of the system of FIG. 1.

FIG. 9 shows a depiction of the system 102 of FIG. 1 that highlights a second delivery path 902 of a first-type notification, corresponding to a second implementation of the system 102. In this implementation, the sender user creates a first-type notification in the course of interacting with the application-agnostic communication component 120 using the sender computing device 104, e.g., by directly interacting with the application-agnostic communication component 120, or by interacting with the application-agnostic communication component 120 via a sender-side PNP component 904 or some other mechanism. As described above, the application-agnostic communication component 120 may correspond to functionality controlled by the operating system of the sender computing device 104, rather than a particular third-party application (although the application-agnostic communication component 120 may optionally use an application component as a transport mechanism).

The counterpart application-agnostic communication component 118 of the recipient computing device 106 receives the first-type notification, bypassing the notification routing component 114. The application-agnostic communication component 118 then forwards the first-type notification to the PNP component 122. The PNP component 122 then presents whatever notification experience is specified in the payload of the first-type notification experience.

Figure 10:
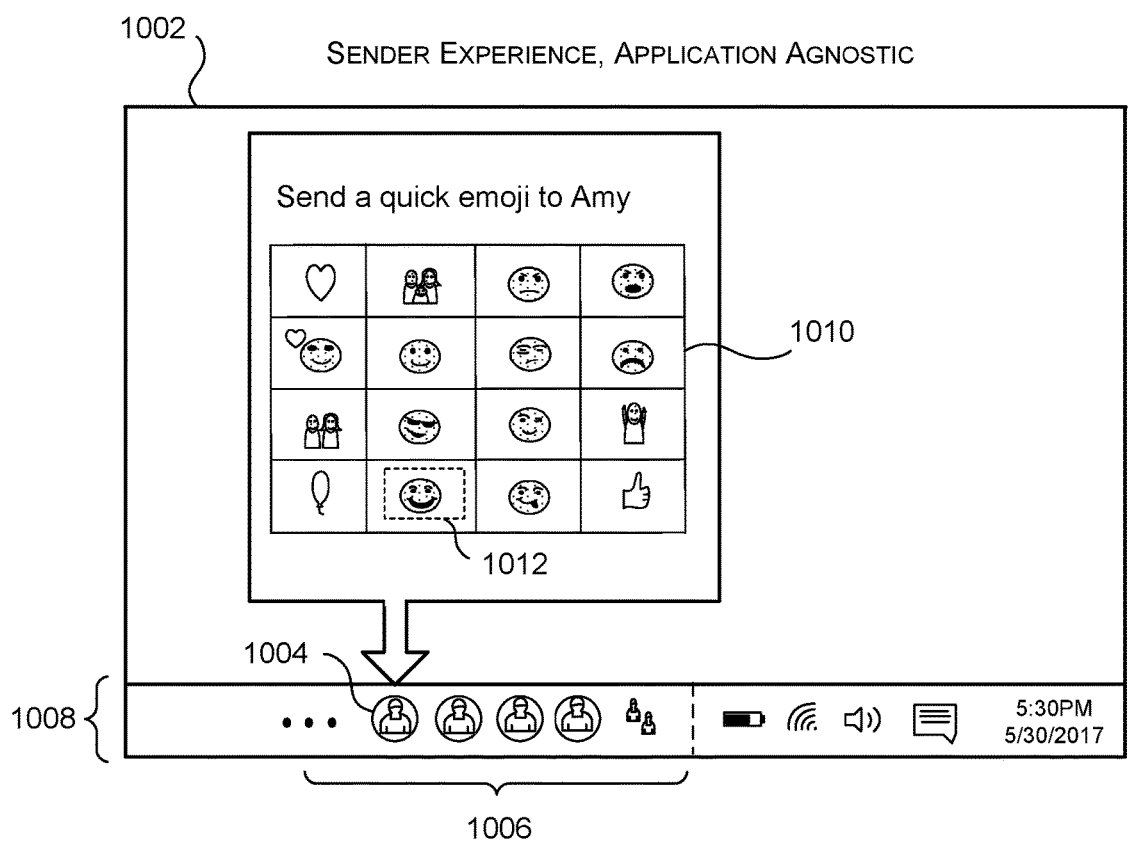
FIG. 10 shows an illustrative user interface presentation through which a sender user can create a first-type notification, in conformance with the second implementation of FIG. 9.

FIG. 10 shows a user interface presentation 1002 by which the sender user can create a first-type notification through interaction with the application-agnostic communication component 120 provided by the sender computing device 104. In one non-limiting case, the sender user initiates a notification experience by clicking on or otherwise interacting with a person indicator 1004 in a people portion 1006 of a task bar 1008. The task bar 1008, in turn, is part of the user interface presentation 1002 provided to the sender user via the sender computing device 104. The person indicator 1004 corresponds to the recipient user to whom the sender user wishes to send a first-type notification.

In response to the sender user's action, the application-agnostic communication component 120 presents a panel 1010 on the user interface presentation 1002. The panel 1010 provides a set of emojis from which the user may select. Assume that the sender user selects a particular emoji 1012. In response, the application-agnostic communication component 120 of the sender computing device 104 sends an associated first-type notification to the counterpart application-agnostic communication component 118 of the recipient computing device 104.

In another case, the sender user may select a first-type notification by first selecting a person within a list of contacts maintained by the sender user. In another case, the sender may invoke a selection process by performing a predetermined gesture, and so on. The above-noted examples are presented in the spirit of illustration, not limitation; other implementations can accommodate other notification-creation strategies. In still other cases described above, the sender user performs some action which indirectly invokes the sending of a first-type notification.

Figure 11:
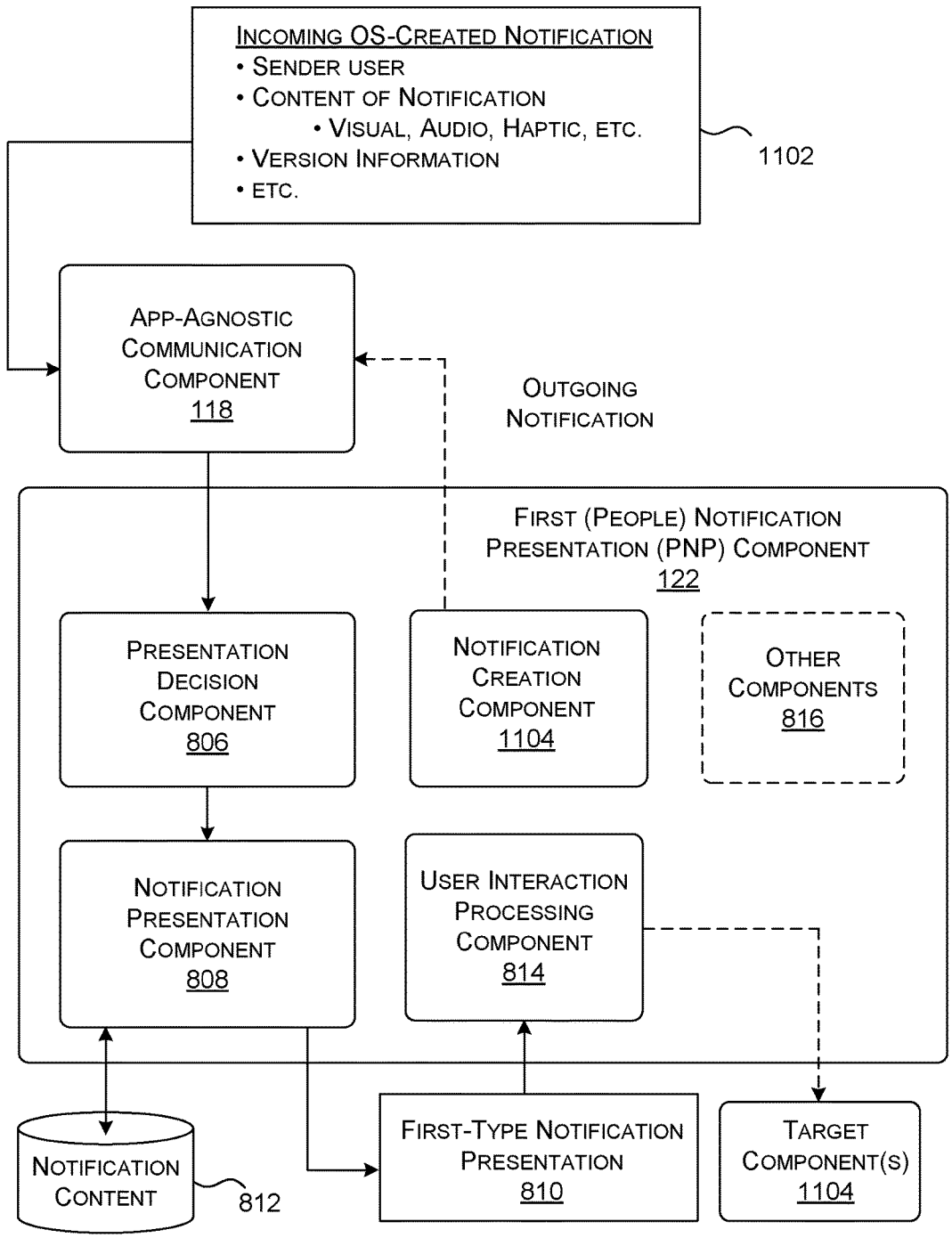
FIG. 11 shows further illustrative details of the second implementation of FIG. 9.

FIG. 11 shows further illustrative details of the second implementation of FIG. 9. In this case, the application-agnostic communication component 120 creates a first-type notification 1102. The first-type notification 1102 can have at least some of the same components as the first-type notification 802 of FIG. 8. In this case, however, the first-type notification 1102 can omit an explicit identifier which specifies that the first-type notification is a first-type notification, since all notifications that the application-agnostic communication component 120 creates are first-type notifications by definition. The system 102 can also infer the identity of the sender user in the manner described above, without necessarily relying on an explicit sender identifier in the first-type notification.

The PNP component 122 can process the first-type notification 1102 in the same manner described above, using the same-named components, to provide a first-type notification presentation 810. When the user interacts with the first-type notification presentation 810, the user interaction processing component 810 invokes any action that is internal to the PNP component 122, and/or can optionally invoke any target component(s) 1104 other than the PNP component 122.

In addition, the PNP component 122 shows a notification creation component 1104. The notification creation component 1104 provides the experience by which the sender user can create a first-type notification, e.g., using the approach illustrated in FIG. 10.

B. Illustrative Processes

Figure 12:
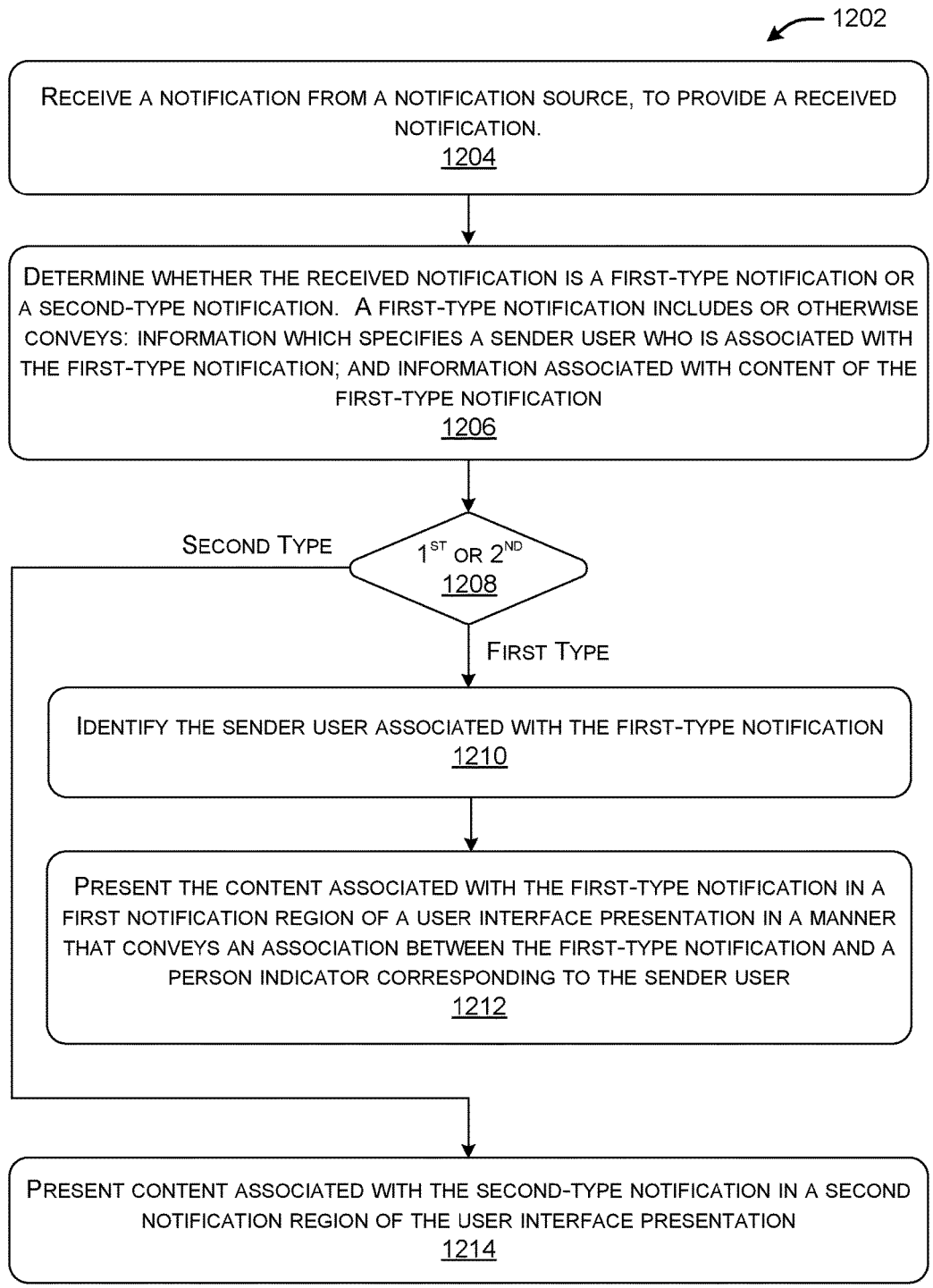
FIG. 12 is a flowchart that describes one manner of operation of the system of FIG. 1.

FIG. 12 shows a process 1202 that explains the operation of the system 102 of Section A in flowchart form. Since the principles underlying the operation of the system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1204, the recipient computing device 106 receives a notification from a notification source (e.g., the sender computing device 104), to provide a received notification. In blocks 1206 and 1208, the recipient computing device 106 determines whether the received notification is a first-type notification or a second-type notification. A first-type notification includes or otherwise conveys: information which specifies a sender user who is associated with the first-type notification; and information associated with content of the first-type notification.

In block 1210, when the received notification is determined to be a first-type notification, the recipient computing device 106 identifies the sender user associated with the first-type notification. In block 1212, the recipient computing device 106 presents the content associated with the first-type notification in a first notification region of a user interface presentation, in a manner that conveys an association between the first-type notification and a person indicator corresponding to the sender user.

In bock 1214, when the received notification is a second-type notification, the recipient computing device 106 presents content associated with the received notification, including a second-type notification associated with the sender user, in a second notification region of the user interface presentation.

In summary, the process 1202 confers one or more technical advantages. According to one aspect, the process 1202 provides a way of drawing the recipient user's attention to desirable notifications sent by (or otherwise associated with) people with whom the recipient user maintains a close relationship, within a stream of potentially less interesting standard notifications. This aspect reduces the risk that the recipient user will miss interesting notifications within a stream of lower-value notifications. According to another aspect, the process 1202 provides an efficient and enjoyable mechanism by which sender users can send (or otherwise triggering the sending of) emotionally-laden notifications to recipient users. According to another aspect, the process 1202 provides an effective mechanism by which an application developer can create a branded notification experience or other type of customized notification experience.

C. Representative Computing Functionality

Figure 13:
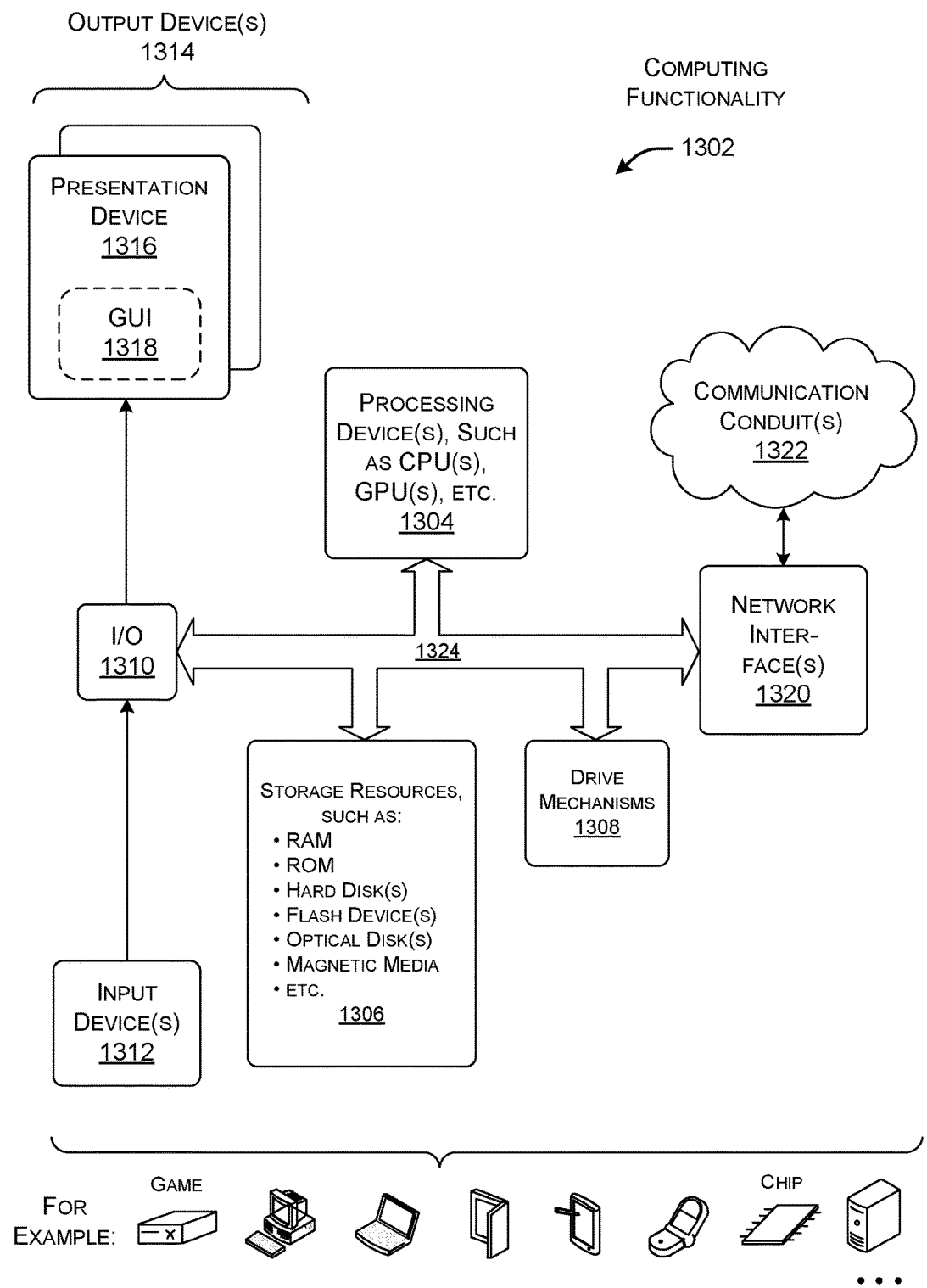
FIG. 13 shows illustrative computing functionality that can be used to implement any aspect of the features shown in the foregoing drawings.

FIG. 13 shows computing functionality 1302 that can be used to implement any aspect of the mechanisms set forth in the above-described figures. For instance, the type of computing functionality 1302 shown in FIG. 13 can be used to implement any of the sender computing device 104 and/or the recipient computing device 106 of FIG. 1. In all cases, the computing functionality 1302 represents one or more physical and tangible processing mechanisms.

The computing functionality 1302 can include one or more hardware processor devices 1304, such as one or more central processing units (CPUs), and/or one or more graphical processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor device(s) 1304 carry out computer-readable instructions stored in any storage resource or combination of storage resources. For instance, the computing functionality 1302 may carry out computer-readable instructions to perform each block of the process 1202 described in Section B. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more video cameras, one or more depth cameras, one or more microphones, a voice recognition mechanism, any movement detection mechanisms (e.g., accelerometers, gyroscopes, etc.), and so on. One particular output mechanism may include a display device 1316 and an associated graphical user interface presentation (GUI) 1318. For instance, the recipient computing device 106 can present the various user interface presentations shown in FIGS. 2-5 on the display device 1316, and the sender computing device 104 can present the various user interface presentations shown in FIGS. 7 and 10 on the display device 1316. The display device 1316 may correspond to a charge-coupled display device, a cathode ray tube device, a projection mechanism, etc. Other output devices include a printer, one or more speakers, a haptic output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself The following summary provides a non-exhaustive list of illustrative aspects of the technology set forth herein.

According to a first aspect, a computing device for presenting notifications on a user interface presentation is described. The computing device includes a first notification presentation component configured to receive and process first-type notifications from a sender computing device, and a second notification presentation component configured to receive and process second-type notifications. A particular first-type notification is received in response to a notification creation event. That particular first-type notification includes or otherwise conveys: information which specifies a sender user who is associated with the particular first-type notification; and information associated with content of the particular first-type notification. The first notification presentation component is configured to: identify the sender user associated with the particular first-type notification; determine whether the user interface presentation includes a person indictor associated with the sender user; and present the content associated with the particular first-type notification in a first notification region of the user interface presentation, in a manner that conveys an association between the particular first-type notification and the person indicator, if the person indicator is determined to be present. The second notification presentation component is configured to present content associated with each second-type notification, including a second-type notification associated with the sender user, in a second notification region of the user interface presentation.

According to a second aspect, the user interface presentation includes a set of person indicators in a people region, corresponding to a particular part of the user interface presentation. The person indicator associated with the sender user appears in the people region.

According to a third aspect, the notification event corresponds to an intentional action that a person makes while interacting with an application provided by the sender computing device.

According to a fourth aspect, the notification event corresponds to an intentional action that a person makes while interacting with an application-agnostic component provided by the sender computing device.

According to a fifth aspect, the notification event corresponds to an intentional action that a person makes to confer a gift to the recipient user from the sender user. The content associated the particular first-type notification represents the gift.

According to a sixth aspect, the first notification presentation component is further configured to: determine that the recipient user of the particular first-type notification has interacted with the representation of the gift in a prescribed manner; and in response to interaction with the representation of the gift, present information to the recipient user which reveals a nature of the gift.

According to a seventh aspect, the computing device further includes a notification routing component that is configured to: determine whether a received notification is a first-type notification or a second-type notification; route each first-type notification to the first notification presentation component; and route each second-type notification to the second notification presentation component.

According to an eighth aspect, the notification routing component is configured to determine whether the received notification is a first-type notification or a second-type notification based on an identifier in the received notification which conveys a type of the received notification.

According to a ninth aspect, the first notification region corresponds to an allocated window of the user interface presentation, and the first notification presentation component is configured to draw within the allocated window in a manner specified by the particular first-type notification that is presented within the allocated window.

According to a tenth aspect, the allocated window includes a transparent background, and the allocated window is configured to direct any user action directed to the transparent background to a display surface underlying the transparent background.

According to an eleventh aspect, the content of the first-type notification that is presented in the allocated window graphically conveys a link between the first-type notification and the person indicator.

According to a twelfth aspect, the person indicator associated with the sender user appears in a particular part of the user interface presentation. Further, the content of the first-type notification that is presented in the allocated window graphically conveys a link between the first-type notification and the person indicator.

Further, the allocated window extends from the particular part into a main display surface of the user interface presentation.

According to a thirteenth aspect, the first notification presentation component is configured to also change at least one visual attribute of the person indicator.

According to a fourteenth aspect, the person indicator appears in a particular part of the user interface presentation, and the first notification presentation component is also configured to modify the person indictor such that the person indicator extends outside a bounds of the particular part.

According to a fifteenth aspect, the first notification presentation component is further configured to create the person indicator when it is determined that the person indicator does not already exist.

According to a sixteenth aspect, the computing device further includes logic configured to present a received first-type notification as a second-type notification when it is determined that the computing device cannot present the received first-type notification as a second-type notification.

According to a seventeenth aspect, a method is described, implemented by at least one computing device, for presenting a notification on a user interface presentation. The method includes: receiving a notification from a notification source, to provide a received notification; and determining whether the received notification is a first-type notification or a second-type notification. A first-type notification includes or otherwise conveys: information which specifies a sender user who is associated with the first-type notification; and information associated with content of the first-type notification. When the received notification is a first-type notification, the method further includes: identifying the sender user associated with the first-type notification; and presenting the content associated with the first-type notification in a first notification region of the user interface presentation in a manner that conveys an association between the first-type notification and a person indicator corresponding to the sender user. When the received notification is a second-type notification, the method includes presenting content associated with the second-type notification in a second notification region of the user interface presentation.

According to an eighteenth aspect, the first notification region (with respect to the seventeenth aspect) corresponds to an allocated window of the user interface presentation. Further, the content of the first-type notification that is presented in the allocated window graphically conveys a link between the first-type notification and the person indicator. Further, an application which provides the first-type notification is given authority to present the content associated with the first-type notification within the allocated window, in a manner specified by the application.

According to a nineteenth aspect, a system is described for presenting notifications. The system includes a sender computing device for generating a notification in response to a notification creation event, the notification being associated with a sender user. The system also includes a recipient computing device configured to: receive the notification, to provide a received notification; determine that the received notification is a first-type of notification as opposed to a second-type notification based on identifier included in or otherwise conveyed by the received notification; and present content associated with the received notification on a user interface presentation in an allocated window such that the content graphically conveys a link with a person indicator, the person indicator, in turn, being associated with the sender user.

According to a twentieth aspect, an application which provides the first-type notification (with respect to the nineteenth aspect) is given authority to present the content associated with the first-type notification within the allocated window, in a manner specified by the application.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing device for presenting notifications on a user interface presentation, comprising:

a first notification presentation component configured to receive and process first-type notifications from a sender computing device; and a second notification presentation component configured to receive and process second-type notifications, a particular first-type notification being received in response to a notification creation event, the particular first-type notification including or otherwise conveying: information which specifies a sender user who is associated with the particular first-type notification and information associated with content of the particular first-type notification, the first notification presentation component being configured to:

identify the sender user associated with the particular first-type notification;

determine whether the user interface presentation includes a person indicator associated with the sender user; and present the content associated with the particular first-type notification in a first notification region of the user interface presentation, in a manner that conveys an association between the particular first-type notification and the person indicator, if the person indicator is determined to be present, the second notification presentation component being configured to present content associated with each second-type notification, including a second-type notification associated with the sender user, in a second notification region of the user interface presentation, wherein the first notification region corresponds to an allocated window of the user interface presentation, wherein the content of the particular first-type notification that is presented in the allocated window graphically conveys a link between the particular first-type notification and the person indicator.

2. The computing device of claim 1, wherein the user interface presentation includes a set of person indicators in a people region, corresponding to a particular part of the user interface presentation, and wherein the person indicator associated with the sender user appears in the people region.

3. The computing device of claim 1, wherein the notification creation event corresponds to an intentional action that a person makes while interacting with an application provided by the sender computing device.

4. The computing device of claim 1, wherein the notification creation event corresponds to an intentional action that a person makes while interacting with an application-agnostic component provided by the sender computing device.

5. The computing device of claim 1, wherein the notification creation event corresponds to an intentional action that a person makes to confer a gift to a recipient user from the sender user, and wherein the content associated with the particular first-type notification represents the gift.

6. The computing device of claim 5, wherein the first notification presentation component is further configured to:

determine that the recipient user of the particular first-type notification has interacted with the representation of the gift in a prescribed manner; and in response to interaction with the representation of the gift, present information to the recipient user which reveals a nature of the gift.

7. The computing device of claim 1, further including a notification routing component that is configured to:

determine whether a received notification is an instance of the first-type notifications or the second-type notifications;

route each instance of the first-type notifications to the first notification presentation component; and route each instance of the second-type notifications to the second notification presentation component.

8. The computing device of claim 7, wherein the notification routing component is configured to determine whether the received notification is an instance of the first-type notifications or an instance of the second-type notifications based on an identifier in the received notification which conveys a type of the received notification.

9. The computing device of claim 1, wherein the first notification presentation component is configured to draw within the allocated window in a manner specified by the particular first-type notification that is presented within the allocated window.

10. The computing device of claim 9, wherein the allocated window includes a transparent background, and wherein the allocated window is configured to direct any user action directed to the transparent background to a display surface underlying the transparent background.

11. The computing device of claim 9, wherein the content of the first-type notifications is animated content.

12. The computing device of claim 9, wherein the person indicator associated with the sender user appears in a particular part of the user interface presentation, wherein the content of the particular first-type notification that is presented in the allocated window graphically conveys a link between the particular first-type notification and the person indicator, and wherein the allocated window extends from the particular part into a main display surface of the user interface presentation.

13. The computing device of claim 1, wherein the first notification presentation component is configured to also change at least one visual attribute of the person indicator.

14. The computing device of claim 1, wherein the person indicator appears in a particular part of the user interface presentation, and wherein the first notification presentation component is also configured to modify the person indicator such that the person indicator extends outside a bounds of the particular part.

15. The computing device of claim 1, wherein the first notification presentation component is further configured to create the person indicator when it is determined that the person indicator does not already exist.

16. The computing device of claim 1, wherein the computing device further includes logic configured to present a received particular first-type notification as a particular second-type notification when it is determined that the computing device cannot present the received particular first-type notification as a particular second-type notification.

17. A method, implemented by at least one computing device, for presenting a notification on a user interface presentation, comprising:

receiving a notification from a notification source, to provide a received notification;

determining whether the received notification is a first-type notification or a second-type notification, a first-type notification including or otherwise conveying:
information which specifies a sender user who is associated with the first-type notification and information associated with content of the first-type notification;

when the received notification is a first-type notification:
identifying the sender user associated with the first-type notification; and
presenting the content associated with the first-type notification in a first notification region of the user interface presentation in a manner that conveys an association between the first-type notification and a person indicator corresponding to the sender user, wherein the first notification region corresponds to an allocated window of the user interface presentation and the content of the fist-type notification that is presented in the allocated window graphically conveys a link between the first-type notification and the person indicator; and when the received notification is a second-type notification, presenting content associated with the second-type notification in a second notification region of the user interface presentation.

18. The method of claim 17,
wherein the presenting conveys the link as a graphical link and/or a proximity link.

19. A system for presenting notifications comprising:
a display; and
a processor configured to:
receive a notification being associated with a sender user, to provide a received notification;
determine that the received notification is a first-type notification as opposed to a second-type notification based on an identifier included in or otherwise conveyed by the received notification;
present content associated with the received notification of the first-type notification on a first notification region that comprises an allocated window of the display such that the content graphically conveys a link between the first-type notification and a person indicator that is associated with the sender user; and
present content associated with the second-type notification on a second notification region of the display.

20. The system of claim 19, wherein an application which provides the first-type notification is given authority to present the content associated with the first-type notification within the allocated window, in a manner specified by the application.

* * * * *